United States Patent [19]

Field et al.

[11] Patent Number: 5,615,041
[45] Date of Patent: Mar. 25, 1997

[54] FABRICATION OF PATTERNED POLED DIELECTRIC STRUCTURES AND DEVICES

[75] Inventors: Simon J. Field, Menlo Park; David A. G. Deacon, Los Altos, both of Calif.

[73] Assignee: Deacon Research, Palo Alto, Calif.

[21] Appl. No.: 467,190

[22] Filed: Jul. 31, 1995

Related U.S. Application Data

[62] Division of Ser. No. 239,799, May 9, 1994, Pat. No. 5,519,802.

[51] Int. Cl.$^6$ ................................................. G02F 1/35
[52] U.S. Cl. ........................... 359/326; 359/328; 359/330; 385/122
[58] Field of Search ................................ 359/326–332; 385/122; 372/21, 22

[56] References Cited

U.S. PATENT DOCUMENTS

| | | | |
|---|---|---|---|
| 4,236,785 | 12/1980 | Papuchon et al. | 385/122 |
| 5,028,109 | 7/1991 | Lawandy | 359/328 |
| 5,036,220 | 7/1991 | Byer et al. | 385/122 |
| 5,061,028 | 10/1991 | Khanarian et al. | 359/332 X |
| 5,064,256 | 11/1991 | Khanarian et al. | 385/130 |
| 5,076,658 | 12/1991 | Hayden et al. | 385/122 X |
| 5,155,791 | 10/1992 | Hsiung | 385/122 |
| 5,157,754 | 10/1992 | Bierlein et al. | 385/122 |
| 5,185,752 | 2/1993 | Welch et al. | 372/22 |
| 5,193,023 | 3/1993 | Yamada et al. | 359/245 |
| 5,239,407 | 8/1993 | Brueck et al. | 359/326 |
| 5,249,191 | 9/1993 | Sawaki et al. | 372/22 |
| 5,255,332 | 10/1993 | Welch et al. | 385/17 |
| 5,317,666 | 5/1994 | Agostinelli et al. | 385/122 |
| 5,333,231 | 7/1994 | Fukuda et al. | 385/122 |
| 5,349,466 | 9/1994 | Delacourt et al. | 359/326 |
| 5,519,802 | 5/1996 | Field et al. | 385/129 |

OTHER PUBLICATIONS

A.L. Aleksandrovskii et al., "Lithium niobate with laminar domains for frequency tripling of Nd:YAG laser radiation", in the abstracts of the International Symposium on Domain Structure of Ferroelectrics and Related Materials (ISFD–2), Nantes, 7–10 Jul. 1992, 19 p.

Burns et al., "Second Harmonic Generation in Field Poled, Quasi–Phase–Matched, Bulk LiNBO$_3$," Compact Blue Green Lasers Conf., Greenbelt, MD Feb. 10–11, 1994, paper CthC3–1.

Burns et al., "Second Harmonic Generation in Field Poled, Quasi–Phase–Matched, Bulk LiNBO$_3$," Phot. Tech. Lett., vol. 6, (2), 1994, pp. 252–254. [No month].

(List continued on next page.)

*Primary Examiner*—John D. Lee
*Attorney, Agent, or Firm*—Townsend and Townsend and Crew LLP; Kenneth R. Allen

[57] ABSTRACT

A poled dielectric structure, such as is useful as a frequency doubler, is fabricated by creating a uniform potential, such as a ground by means of an electrode surface, adjacent a first surface of a polable dielectric material, such as a piezo-electric or lithium niobate, and then applying an electric field adjacent a second surface of the polable dielectric material, where the electric field is spatially-modulated according to a three-dimensional modulation pattern with a field amplitude level at selected locations sufficient to cause atomic rearrangement within predefined regions in the polable material, and where the modulation amplitude level of the modulation pattern is controlled according to a modulation parameter. The control mechanism of modulation amplitude level may be protrusions of an electrically-conductive material extending toward the polable material or by modulated variations in the dielectric constant of a dielectric material separating the polable material from an electrode plate. The electrically-conductive material may be a plate, a deposited layer or a liquid. The pattern may be periodic and may be aligned to form patterned poled structures, including waveguides. A first electrode and a second electrode may be disposed opposed to one another across a wafer of polable material or they may be along edges of the polable material transverse to one another, with the electrode on the wafer surface having a crenulated edge directed toward the second electrode.

19 Claims, 13 Drawing Sheets

OTHER PUBLICATIONS

Janzen et al., "Electric Field Induced Ferroelectric Microdomain Inversion on X–and Y–Cut Lithium Niobate," Integrated Photonics Research conf., Paderborn, germany, 1992, Paper TuD5–1. [No month].

Janzen et al., "Integrated Optical Solid State Lasers and Quasi–Phasematched Nonlinear Devices," European Conference on Optical Communications Companion Workshop, near Berlin, Germany, Sep. 24–26, 1992.

Mangel et al., "Quasi–Phase–Matched–Second–Harmonic Generation of Blue Light in Periodically Poled LiNBO$_3$," Appl. Phys. Lett., vol. 56 (2), Jan. 8, 1990, pp. 108–110.

Matsumoto et al., "Quasiphase–Matched Second Harmonic Generation of Blue Light in Electrically Periodically Poled Lithium Tantalate Waveguides," Electron. Lett., vol. 27, (22), Oct. 24, 1991, pp. 2040–2042.

Mizuuchi et al., "Fabrication of Periodic Domain Inversion in an X–Cut LiTaO$_3$," Appl. Phys. Lett., vol. 62 (16), Apr. 19, 1993, pp. 1860–1862.

Siebert et al., "Ferroelectric Microdomain Reversal on Y–Cut LiNbO$_3$," Proc. Soc. Phot. Instru. Eng., No. 1362, 1990, pp. 370–376. [No month].

Van der Poel, et al., "Efficient Type I Blue Second–harmonic Generation in Periodically Segmented KTiOPO$_4$ Waveguides," Appl. Phys. Lett., vol. 57 (20), Nov. 20, 1990, pp. 2074–2076.

Yamada et al., "First–Order Quasi–Phase Matched LiNbO$_3$ Waveguide Periodically Poled by Applying an External Field for Efficient Blue Second–Harmonic Generation," Appl. Phys. Lett., vol. 62 (5), Feb. 1, 1993, pp. 435–436.

Yamada et al., "First–Order Quasi–Phase Matched LiNbO$_3$ Waveguide Periodically Poled by Applying an External Field for Efficient Blue Second–Harmonic Generation," Advanced Solid state and Blue Green Laser Conf., Undated, paper CThA1–1.

FABRICATION OF PATTERNED POLED DIELECTRIC STRUCTURES AND DEVICES

This is a Division of application Ser. No. 08/239,799 filed May 9, 1994 (now U.S. Pat. No. 5,519,802).

BACKGROUND OF THE INVENTION

This invention relates to techniques for fabricating patterned poled structures and devices from polable materials, and in particular periodically poled dielectric structures, as well as devices incorporating periodically-poled structures. The invention has wide application in optical systems, and in particular to nonlinear optical systems, such as frequency doublers, optical parametric oscillators and amplifiers, optical waveguides and the like.

The ferroelectric materials of choice for nonlinear optical interactions are $LiNbO_3$, $LiTaO_3$ and KTP. Ferroelectric domain inversion is generally produced by in-diffusion and heat treatment, e.g., Ti in-diffusion, proton exchange and Ba in-diffusion respectively for the three materials. In $LiNbO_3$ and $LiTaO_3$ these poling techniques generate shallow domains in the polable materials, only suitable for shallow waveguide interactions. For maximum overlap with the optical waveguide modes and optimum device efficiency the domain inverted grating should have a rectangular shape with vertical domain walls. However, in $LiNbO_3$ the titanium in-diffusion process (U.S. Pat. No. 5,036,220) creates a triangularly shaped domain inversion grating and in $LiTaO_3$, proton exchange and heat treatment at around 600° C. (U.S. Pat. No. 5,249,191) produces semicircular shaped domains. These odd shaped, non-rectangular domains reduce the efficiency of the desired nonlinear interaction.

In KTP the inverted domains generated by Ba diffusion (U.S. Pat. No. 5,157,754, Van der Poel et al Appl. Phys. Lett. 57 (20), p2074–6, 1990) are rectangular with vertical sidewalls due to the anisotropic nature of the diffusion process. But they are relatively shallow: they can be used for waveguide interactions but are not very efficient for bulk applications. An added complication to the KTP domain inversion process is that the domain inversion is performed in the same ion-exchange step as is used to form the optical waveguide. Although this means that only a single processing step is required to fabricate the device (rather than separate domain inversion and waveguide fabrication processes), it also means that the waveguide and domain inversion dimensions cannot be independently optimized to achieve maximum performance. In order to obtain a periodically inverted domain pattern a segmented waveguide is formed consisting of alternating guiding ion-exchanged regions and non-guiding unexchanged crystal. The application of a different domain inversion procedure, such as electric field induced poling, would separate the two fabrication processes, allowing independent optimization.

The domain inversion processes available in the prior art are limited to the fabrication of relatively shallow surface features that are only suitable for waveguide based interactions. [With the exception of periodically poled fibers of $LiNbO_3$ grown by the laser heated pedestal growth technique as described by Magel et al (Magel et al Appl. Phys. Lett. 56 (2), p108–10, 1990)]. However, these periodically poled fibers suffer from the inability to control the domain dimensions and boundary positions to a sufficient degree to ensure phase matching over a long sample length greater than about 3 mm.]For higher power interactions, such as the frequency conversion of high power and pulsed laser systems, waveguide devices are unsuitable because the intensity generated on the front face of the crystal when launching into the waveguide far exceeds the material damage threshold. To avoid physical damage to the nonlinear crystal the high power beam focus must be relaxed. For periodic poled material to be useful in such cases, the poling must be quite uniform across the aperture of the bulk crystal. A domain inversion process is needed which will provide bulk periodic poling in ferroelectric materials.

Electric field-induced poling, as demonstrated by Yamada et al in $LiNbO_3$ (U.S. Pat. No. 5,193,023), offers the possibility of vertical walled domain structures for maximum performance and deep poling suitable for quasi-phase-matching of bulk interactions in all ferroelectrics. Yamada et al describe the use of patterned metal electrodes 22 deposited on the crystal ±z surfaces combined with the application of a pulsed high voltage 20, as illustrated in FIG. 2a. The high voltage pulse exceeds the crystal coercive field and produces domain inversion 12 under the metal electrode. However, frequent destructive electrical breakdown events remain a problem and have so far prevented this poling technique from being adopted for device production. Reports of electric field poling work in the scientific literature [Yamada et al, Appl. Phys. Lett., 62 (5), p435–6, 1993; Yamada et al, ASSL and Blue Green Lasers 1993, paper CThA1-1, Optical Society of America.] are limited to crystal substrate thicknesses of 100 μm due to the destructive effects of electrical breakdown. Larger apertures are required for bulk crystal applications.

Following the approach of Yamada et al, Burns et al [Burns et al, Paper CThC3-1, Compact Blue Green lasers 1994, Optical Society of America, Burns et al, Phot. Tech. Lett., Vol 6, p252–4, 1994] have very recently achieved domain inverted structures in about 250 μm thick $LiNbO_3$ slabs. However, electrical breakdown events remain a problem, and the width of the inverted domains is not well defined by the photolithographically patterned metal electrode, significantly reducing the efficiency of the device.

The use of electric fields to pole ferroelectric crystals in a patterned form for quasi-phase-matching was proposed in 1980 by Papuchon et al (U.S. Pat. No. 4,236,785) based on x or y-cut crystal substrates. In that invention, crenulated electrode structures 24 were fabricated by photolithography on the x or y-cut surface 26 of the optical crystal as shown schematically in FIG. 2b, with a period defined by the coherence length of the desired nonlinear interaction. A high voltage is applied across the two electrodes such that the electric field is antiparallel to the crystal z direction (the spontaneous polarization direction of the material) to periodically domain invert the crystal substrate. This periodic poling technique has since been realized using $LiNbO_3$ as the crystal substrate, and reported in the scientific literature, [Janzen et al, Integrated Photonics Research, paper TuD5-1, 1992, Optical society of America], but the inverted domains are necessarily very shallow ($\leq 2$ μm) because the electric field between the coplanar electrodes does not penetrate deeply into the crystal.

Also proposed by Papuchon et al was the deposition and patterning of a second electrode over that used for domain inversion, allowing the application of different voltages to the inverted and uninverted domain sections in the quasi-phase-matched grating, and the subsequent tuning of the quasi-phase-matched interaction wavelength peak using the electro-optic effect.

Matsumoto et al (Electron. Lett., 27, p 2040–2, 1991) describes the second harmonic generation of blue light in electrically periodically poled LiTaO$_3$ waveguides. The z-cut LiTaO$_3$ crystal substrate was poled by applying a periodic electric field using interdigital electrodes while heating the sample to just below the Curie temperature about 610° C. The conversion efficiency of the waveguide device fabricated was significantly lower than those fabricated by proton exchange on the +z face and has not been pursued further.

Siebert et al (Proc. Soc. Phot. Instr. Eng., 1362, p370–6, 1991) report ferroelectric microdomain reversal on y-cut LiNbO$_3$ surfaces using the pyroelectric effect to generate an electric field. A pair of crenulated electrodes is patterned on the y-cut face separated by about 6 μm along the z axis and with a period of 30 μm. Heating the crystal to about 100° C. generates sufficient voltage across the electrodes, due to the pyroelectric effect, to spatially periodically invert the ferroelectric domains between the electrodes. The electric fields do not however dip deep into the crystal, so the resulting domains are only about 1 μm deep, too shallow even for waveguide based interactions to be efficient.

Mizuuchi et al (Appl. Phys. Lett., 62, p1860–2, 1993) disclose a technique for fabricating periodic domain inversion in x-cut LiTaO$_3$ using selective proton exchange and quick heat treatment, as performed more commonly on the z-cut face. The domain inverted regions are inclined at an angle to the z-axis in the y-z plane. However, quasi-phase-matched nonlinear interactions have yet to be demonstrated in such a domain inverted structure.

Electric field poling is not limited to ferroelectric materials. Brueck et al (U.S. Pat. No. 5,239,407) report the creation of a large second order nonlinearity in fused silica when exposed to a high electric field (about 5kV/mm) at elevated temperatures (250°–325° C.). The stable nonlinearity is thought to be due to the migration of ionic contaminant species within the fused silica under the influence of the applied electric field.

Organic polymer materials can also be poled to produce second order optical nonlinearities by the application of electric fields (e.g. U.S. Pat. No. 5,064,265). A pendant group which exhibits second order nonlinear susceptibility is added as a side chain to a thermoplastic polymer. Poling is achieved by heating the polymer near or above its glass transition temperature, applying a DC electric field to align the molecular dipoles of the side chain pendant groups in a uniaxial orientation, and cooling the polymer while still under the influence of the electric field to fix the alignment of the side chain molecules.

The current art is unable to provide a number of features required for the manufacture of cheap visible light sources, based on quasi-phase-matched second-harmonic-generation, and bulk periodically poled material for nonlinear optical interactions. These problems are poor reproducibility from sample to sample, shallow inverted domains unsuitable for bulk optical interactions, and the destructive effects of electrical breakdown on the crystal substrate.

The field of integrated optic waveguide frequency conversion devices has, in the prior art, been based almost exclusively on z-cut ferroelectric materials because the best developed of the known domain inversion processes are only applicable to z-cut surfaces and only produce shallow inverted domains. This is the case with titanium in-diffusion into LiNbO$_3$ and barium ion exchange in KTP. To access the largest nonlinear optical coefficient in these materials, $d_{33}$, the pump and signal beams must be polarized along the z axis, requiring a transverse magnetic (TM) polarized waveguide mode (polarized perpendicular to the plane of the waveguide chip). However, semiconductor diode lasers, which are the most attractive pump sources for many nonlinear optical frequency conversion interactions, are polarized in the transverse electric mode (TE), i.e. polarized parallel to the plane of the diode, and therefore require a costly polarization rotation element to be inserted between the diode and nonlinear crystal. There is significant need therefore for a manufacturable technique of periodically poling x or y-cut ferroelectric crystals so that the waveguide mode can be TE polarized to match the diode laser input and still access the large $d_{33}$ nonlinear optical coefficient.

Electric field poling is difficult since the electric field strength required for poling is close to the threshold for electric breakdown. In order to achieve poling, the applied field must be above that required for poling, but not too far above the breakdown field. In practice, this is very difficult to achieve, and the difficulty becomes more severe with larger samples where the breakdown field can vary across the sample.

The prior art has an intrinsic difficulty with breakdown. Due to the electrode configuration, portions of the material experience an electric field which is significantly higher than the average applied field in the bulk of the sample. The electrode pattern which is used in the prior art concentrates the electric field, resulting in severe breakdown problems.

It has been determined that the problem in the prior art is caused by the electrode geometry, which is typically formed photolithographically into a pattern as shown in FIG. 2a (Prior Art). A metal film 22 is patterned to form a continuous contact layer over the regions 12 where the poling is desired, and the film is removed over the areas 13 where the original poling is not to be disturbed. A field is applied between electrodes 21 and 22, typically during a short pulse, and poling is achieved above a certain applied voltage. Unfortunately, in many of the samples electric breakdown occurs at some time during the applied pulse, and the resulting arc discharge physically destroys the sample. Breakdown occurs with such a high probability that electric field poling has not been considered as a viable method for producing domain-inverted ferroelectric material.

The problem with the prior art electrode arrangement can be seen from an analysis of the electric field pattern at the surface of the substrate material. In the geometry of FIG. 2a, the normal component of the electric field on the surface in the gaps 23 between electrodes is almost exactly 0.5 times the value $E_o$ of the electric field in the bulk far from the patterned electrode. This is shown for example by J. D. Jackson in his well known book *Classical Electrodynamics* (Second Edition), in the section treating mixed boundary conditions. From Gauss' Law, it follows that the average normal field along the surface under the electrodes must be substantially higher than the bulk field $E_o$. In LiNbO$_3$, it has not been possible to consistently apply a field $E_o$ which exceeds the poling threshold without also exceeding the breakdown threshold somewhere in the sample. This problem is due to the enhancement of the field under the electrodes.

If the spatial duty factor of the electrodes is 50% (i.e., the width of the electrodes is 50% of the period), the average normal field under the electrodes is 1.5×$E_o$. The peak field under the electrode is even larger. From Faraday's Law, we know that the normal component of the electric field varies continuously as a function of the position x from its value of 0.5×$E_o$ at one edge of the electrode up to its peak value and back down to 0.5×$E_o$ at the other edge of the electrode. We can estimate the magnitude of the peak field even without an explicit solution of the electrostatics problem if we assume a reasonable functional form for the x-variation of the normal field. Assuming a sinusoidal dependence, one can calculate a peak normal field of $2.5 \times E_o$. In reality, the peak field is somewhere in the neighborhood of twice the bulk field.

The room temperature breakdown field of $LiNbO_3$ is reported by the Sony group (Yamada et al) to be around 26 kV/mm. The required field for poling is between 22 and 24 kV/mm at room temperature, which leaves a margin of no more than 20%. The bulk field must exceed the poling field or domain reversal will not propagate through the sample. (While it is known that the poling field decreases at higher temperatures, the breakdown field also decreases, so that no large advantage is obtained at high temperature.) To achieve poling, the applied field must exceed the poling field, but the applied field must not exceed the breakdown field by too much for too long, or the sample will be destroyed by a catastrophic electron avalanche. The margin between the required and the maximum fields is clearly narrower than the factor-of-four variation in the applied field.

The simple periodic electrode structure practiced in the prior art cannot maintain the largest (peak) applied field below the breakdown field in $LiNbO_3$ while still exceeding the poling field in the bulk of the polable material 8. A similar problem exists in other ferroelectric materials such as KTP and $LiTaO_3$. A technique is needed to allow periodic poling while not exceeding the breakdown field. A periodic electrode structure is needed which modulates the applied field above and below the poling field along the surface of the sample (to control the spatial extent of the regions which are to invert their nonlinear optical polarity), while controlling the peak field so that it does not exceed the breakdown field by too much or for too long during the applied voltage pulse.

SUMMARY OF THE INVENTION

According to the invention, a poled dielectric structure, such as is useful as a frequency doubler, is fabricated by creating a uniform potential, such as a ground by means of an electrode surface, adjacent a first surface of a polable dielectric material, such as a piezo-electric or lithium niobate, and then applying an electric field adjacent a second surface of the polable dielectric material, where the electric field is spatially-modulated according to a three-dimensional modulation pattern with a field amplitude level at selected locations sufficient to cause atomic rearrangement within predefined regions in the polable material, and where the modulation amplitude level of the modulation pattern is controlled according to a modulation parameter. The control mechanism of modulation amplitude level can be controlled by protrusions of an electrically-conductive material extending toward the polable material or by modulated variations in the dielectric constant of a dielectric separating the polable material from an electrode plate. The electrically-conductive material may be a plate, a deposited layer or a liquid. The pattern may be periodic and may be aligned to form patterned poled structures, including waveguides. A first electrode and a second electrode may be disposed opposed to one another across a wafer of polable material or they may be along edges of the polable material transverse to one another, with the electrode on the wafer surface having a crenulated edge directed toward the second electrode.

According to a further embodiment of the invention, the modulation amplitude level may be selectively enhanced in piezo-electric materials by stressing the materials while applying a poling force. The shape of the control mechanism may include regions of field concentration formed for example by corners adjacent the surface of the polable material to promote nucleation (creation of initial growth centers) of controlled domain-orientation. The degree of domain-orientation can be controlled by limiting charge transfer between the control mechanism and the uniform potential electrode.

Various products made according to the process are suggested.

Desired poling results are achieved by modulated control of the electric field excursions produced by an electrode pattern. By reducing the peak value of the applied electric field, the invention allows the use of a higher average electric field without causing breakdown. Alternatively it reduces the probability of breakdown significantly at a fixed applied voltage, making possible poling of large, production-scale wafers.

The invention will be better understood by reference to the following detailed description in connection with the accompanying drawings.

DESCRIPTION OF SPECIFIC EMBODIMENTS

Figure 1:
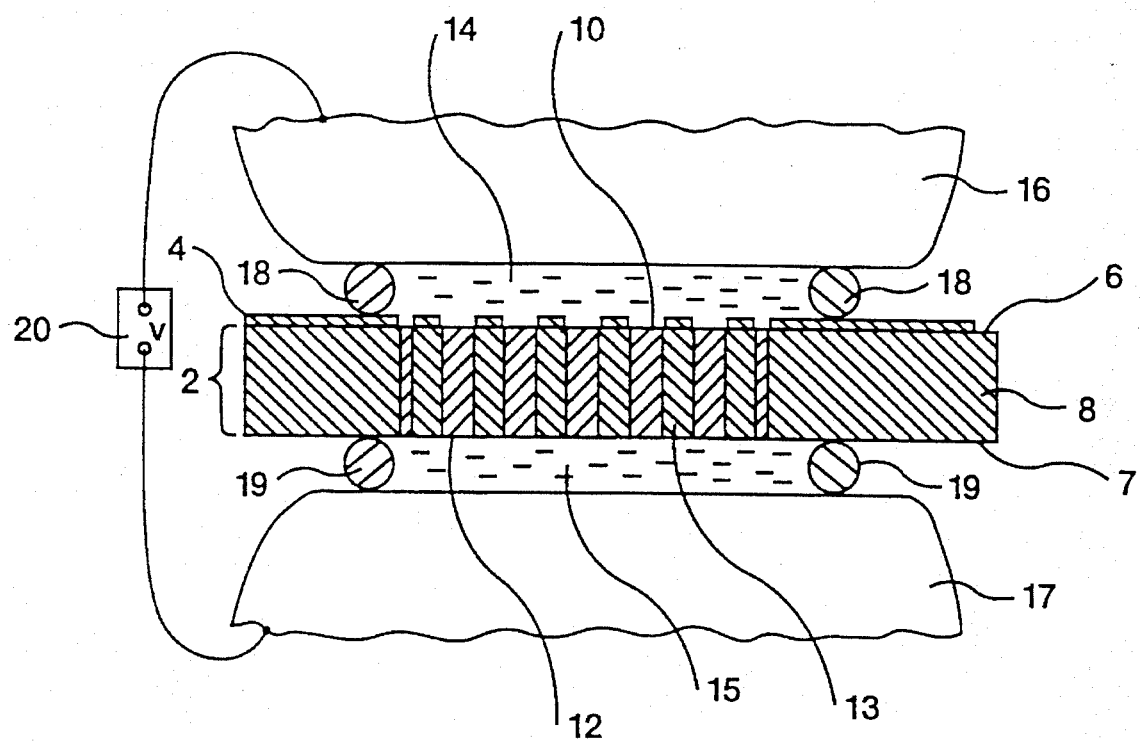
FIG. 1 is a cross-section of one example of a structure made according to the invention

The present invention comprises using a patterned dielectric spacer layer covered by a conducting layer. The conducting layer is brought to a predetermined voltage by drive circuitry, but the applied field at one surface of the sample is modulated by the (controllable) distance to the conducting layer. FIG. 1 is a cross-section of one example of a structure made according to the invention. In FIG. 1, an electrically-insulating layer 4 has been deposited and patterned to cover areas 13 where domain inversion is not desired. A continuous conducting layer 14, such as a conductive liquid, is then provided, making contact with the sample in the gaps 10 left by the patterned insulator, and covering the insulator. The equipotential surface defined by the conducting surface is therefore spatially corrugated in alignment with the field (the vertical direction) in a manner defined by the thickness and location of the remaining regions of insulating film.

The advantage of this configuration over the prior art is most easily seen by examining the electric field distribution at the surface of the sample as a function of the differential thickness d of the patterned electrically-insulating layer. In the limit as d approaches zero, the electric field is totally uniform, and is equal to the bulk field $E_o$, or the applied voltage divided by the thickness of the sample. In the limit where d is very large compared to the period P, the surface field is strongly modulated, with its maximum value under the regions where the conducting layer touches the surface, and its minimum value under the insulator regions. The x-dependence of the field takes on a characteristic functional form dictated by Maxwell's equations, and which depends only on the duty factor (for a periodic structure, far from edges and other pattern changes). As the differential thickness d is varied between these two extremes, the modulation of the normal component of the applied electric field changes from its maximum value to zero.

The importance of the present configuration and method of construction is this ability to control the modulation depth of the applied electric field, an ability virtually absent in the prior art. By adjusting the differential thickness d, the field modulation can be reduced enough to avoid breakdown while still achieving domain-reorientation or poling. The thickness d is a selected amplitude modulation parameter which can be adjusted to control the electric field strength in selecteed regions within the polable material 8, including in particular the peak-to-peak field variation at the surface 6. (By poling we mean the atomic orientation of the microscopic dipoles within the polable material. Poling can include domain reversal in a previously uniformly poled substrate, establishing a poling direction within a wafer which previously had domains of random orientation, or orienting a domain in a substrate which was partially poled.) The patterned layer may be a dielectric material which covers the areas which are not to be inverted. (In the prior art, the patterned layer is a metal and covers the areas which are to be inverted.)

The invention is a method of applying the desired patterns, creating a uniform potential, and controlling the electric field according to a modulation pattern, the modulation pattern being for example produced by protrusions from a conductive material, which in the case of FIG. 1 is a conductive liquid.

FIG. 1 illustrates schematically a cross section through a structure made according to the preferred embodiment method of a patterned poled dielectric material 2. The polable material 8, which is, in this preferred embodiment a ferroelectric crystal consisting of commercially-available single domain $LiNbO_3$, is cleaned, e.g. by oxygen plasma ashing, to remove all hydrocarbon and other contaminants remaining from the polishing and handling processes. An electrically-insulating dielectric film 4 is deposited as a mask with a predetermined thickness in a preselected x-y pattern on a z-cut face 6 of the crystal. The electrically-insulating dielectric film is, for processing simplicity, composed of organic photoresist and may be up to several microns in thickness. (Other insulating materials such as $SiO_2$ or $TiO_2$ may alternatively be used. Although electric insulation is desirable, it is not required of our dielectric materials, provided that the material withstands the high applied voltage without breakdown or deterioration.) The pattern of the electrically-insulating, electric-field-strength controlling mask with selected thickness, is obtained by exposing the photoresist through a suitable photomask using standard contact lithographic techniques. (An alternative patterning procedure would involve projection photolithography which requires no contact between the photomask and crystal substrate, and is more suited to high volume production applications).

Figure 3:
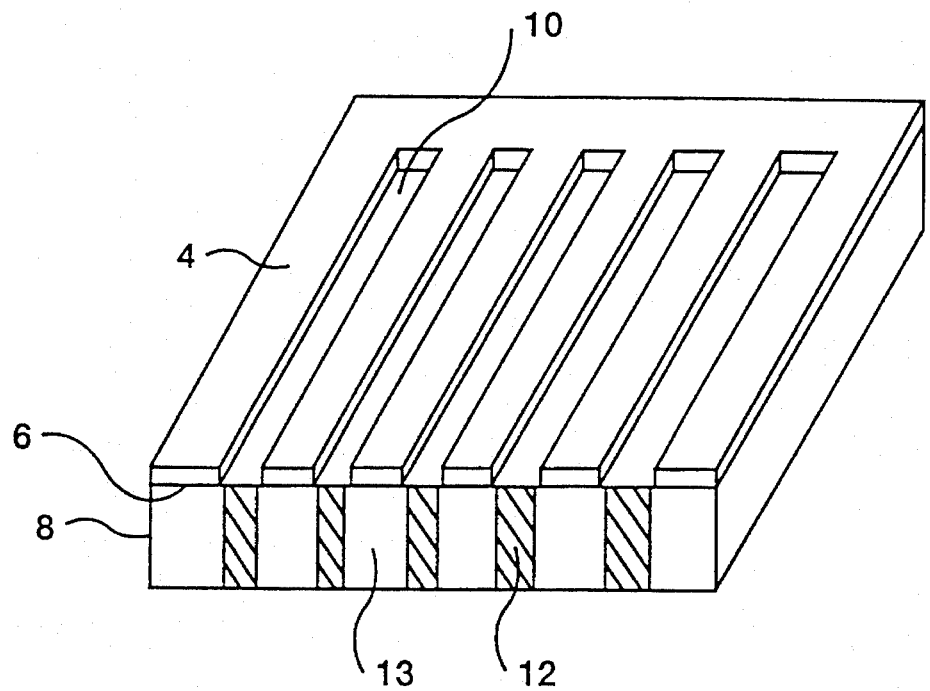
FIG. 3 is a perspective view in partial cross section of an electric field controlling mask on a wafer of polable material.

The electric field controlling mask of FIG. 1 is shown in perspective in FIG. 3 and consists of a planar electrically-insulating film 4 deposited on the +z surface of the $LiNbO_3$ 8, in which contact-windows 10 are patterned to allow direct electrical contact with the crystal by the electrode material (e.g., the conductive liquid).

In the preferred embodiment with $LiNbO_3$ as the ferroelectric substrate crystal, the patterned electric field controlling mask is formed on the +z crystal surface, as this is where domain nucleation occurs, followed by growth towards the −z face. As domain inversion is nucleated on the +z surface there is no need to provide a patterned mask on the −z face, consequently a planar electrically-conducting material provides suitable electrical contact to the −z face. In all embodiments for $LiNbO_3$ and other ferroelectric materials, such as $LiTaO_3$, KTP, $KNbO_3$, $BaTiO_3$, SBN, $Ag_3AsS_3$, etc., and for other non-ferroelectric materials, such as certain polymers (having dipolar chromophores with large hyperpolarizability) and fused silica, the patterned electric field controlling mask should be applied to the material surface at which domain nucleation occurs. The polable material must be a dielectric for the electric field poling process to work because it must be capable of supporting an applied field without being destroyed. It need not be an insulating material as long as the induced currents cause no damage during the poling process.

Electrical contact to a first surface 7 of the material, the −z surface, is made by a first electrically-conductive material 15 which may in any embodiment be, for instance, a liquid conductor, a thin metal film deposited on the −z surface, or a bulk electrical conductor adjacent to the −z surface. Note that adjacent in the context of the embodiments herein includes the use of coatings between materials (the surface and the conductor). Electrical contact to a second surface 6 of the material, the +z surface, opposing the first surface, is achieved by the deposition of a second electrically-conductive material 14 (can be the same material as the first electrically conductive material) upon the electrically-insulating dielectric film. The opposing surface is somewhat distant from the first surface, and may be parallel to the first surface, or angled and/or curved and/or with corners, edges, and/or indentations, according to the application geometry. The planar local geometry shown in the figures therefore includes larger scale three dimensional structures in the polable dielectric material, and of course, the films have true three dimensional structure. The second electrically-conductive material in liquid form may be a saturated aqueous solution of a salt such as LiCl or KCl. The liquid conductor fills the contact-windows in the insulating dielectric film and contacts the crystal +z surface. Due to the small dimensions of the contact-windows, occasional air bubbles may be trapped between the liquid conductor and the second surface of the crystal, occasionally preventing good electrical contact from being made.

Electrical contact to the liquid conductor is made using electrically-conducting plates 16, 17 or wires, allowing good current distribution as the area of the sample to be poled is increased. The liquid conductor is confined to the desired area(s) of the surface(s) of the polable material as illustrated schematically in FIG. 1, e.g. using rubber o-rings 18, 19. Confinement is required to prevent the liquid conductor from creeping over the edges of the polable material and causing electrical flashover and a short circuit during the poling process.

A pulsed high-voltage electrical potential is applied across the crystal substrate using a suitable power supply 20, to oppose the spontaneous polarization direction of the substrate crystal, i.e., a positive voltage is applied to the +z face of the crystal, and the −z face is grounded. Alternatively, a negative voltage may be applied to the electrically conducting material placed adjacent to the −z face while the means for controlling the electric field strength placed adjacent to the +z face is grounded. It is not necessary for the electrically conductive materials used for the electrodes to have the conductivity of a metal; it is sufficient that a uniform potential can be applied via the electrically conductive material during the poling process. The uniform potential may include small potential variations across the polable dielectric material provided that the resultant field variations at the nucleating surface for the domain inversion are small compared to the variations imposed by the means for controlling the electric field strength, and provided that the resultant field variations at the opposite surface of the polable dielectric material do not cause the bulk field strength to fall below the threshold field for propagation of the poling. It should also be noted that any ground is a sufficient electrode, no matter how far away it may be placed from the sample. If a ground plane is used as one of the electrodes, it should be kept close only to reduce the potential required to produce the needed electric fields within the polable dielectric material.

Multiple high-voltage pulses may be applied to the sample, each with a duration ranging from μs to seconds. In all embodiments the applied effective potential must exceed the coercive field of the crystal at some point in the crystal in order to achieve poling. The domain-orienting potential threshold depends on the electrode configuration and the sample temperature. For the preferred embodiment with a photoresist insulating layer and a saturated LiCl electrode at room temperature, the domain-reversing potential threshold for a LiNbO$_3$ substrate crystal is around 23–24 kV/mm. For fused silica, the effective domain-orienting potential is approximately 5 kV, independent of the thickness of the fused silica wafer.

Figure 2A:
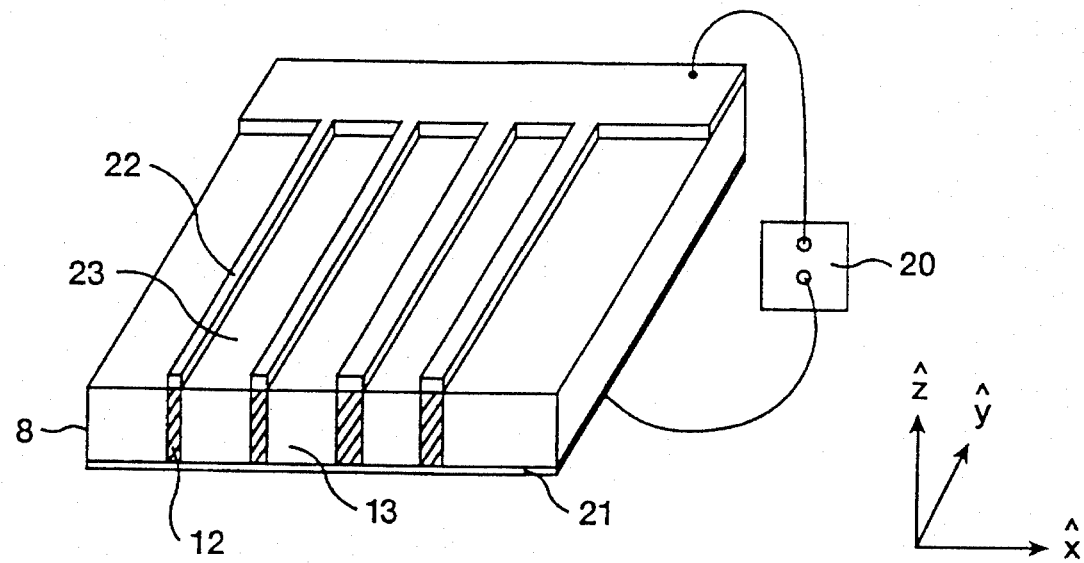
FIG. 2a is a first structure according to the prior art.
Figure 2B:
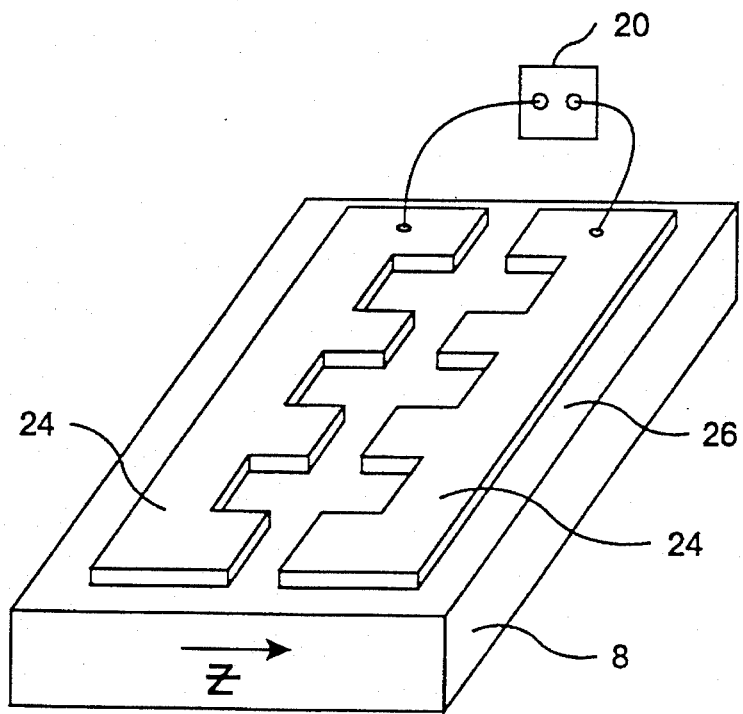
FIG. 2b is a second structure according to the prior art.

The electric field within the crystal is modulated by the differential thickness of the patterned insulating dielectric film. Thus domain inversion 12 is obtained under the contact-windows in the insulating electric field controlling mask, contrasting with the prior art (FIG. 2a) where domain inversion is obtained directly beneath the patterned conductive mask 22. The inverted domains formed by the invention (FIG. 1) have dimensions determined by, but not necessarily exactly the same size as, the dimensions of the configuration of photolithographically defined contact-windows on the insulating electric field controlling mask. It should be noted that direct electrical contact is not necessary for poling to occur. An insulating film may prohibit contact between any of the conducting electrodes and the polable material. Poling will still occur provided the applied electric field is above an effective field.

If poling is performed at elevated temperatures, the domain reversal potential threshold is decreased. Experimentally it has been observed to drop from about 11.8 kV at room temperature to about 8.9 kV at 230° C. with electrical contact to the crystal made using electrically-conducting epoxy. Poling was performed in an oil bath heated on a hot plate. It has been reported (Janzen et al, ECOC'92 Companion workshop, 1992) that the crystal breakdown potential threshold also decreases with increasing sample temperature. However, our own experiments indicate that poling at an elevated temperature ($\leq$230° C.) reduces the likelihood of breakdown occurring when combined with electrically-conducting epoxy contacts to the crystal. It is expected that the same reduction in breakdown likelihood will result from poling samples at elevated temperature using the methods of the invention. The sample temperature may be elevated during poling by, for instance, placing the entire poling electrode apparatus in an oven, or alternatively by illuminating the sample with a heat lamp.

Electrical breakdown events which can occur during the electric field poling of LiNbO$_3$ are thought to be the result of an electron avalanche. Unlike the prior art, such as Yamada et al who reduced the effects of breakdown by thinning the substrate crystal (to about 100 μm) so that the electrons passed entirely through the crystal before obtaining sufficient energy to destroy the sample, in the present invention, breakdown is controlled by the modulation of the electric field due to a patterned insulating dielectric film, resulting in no electron avalanche effects. This enables thick substrates (>500 μm) to be poled. In fact, the maximum sample thickness that can be poled appears limited simply by the available high voltage pulse.

During poling, the voltage across the sample and the current flow are monitored. The charge transfer to the ferroelectric crystal is deliberately limited to the amount required to produce the desired domain inversion pattern, which is known to be about 1.4 μC mm$^{-2}$ for LiNbO$_3$. The charge flow may be limited by 1) restricting the current flow in the circuit (for instance with a resistor connected in series with the crystal), 2) restricting the applied voltage (the closer the applied voltage is to the poling threshold, the lower the current which flows), 3) restricting the pulse length of the applied voltage, or by 4) any combination of these variables. By limiting the charge flow to that required to create the desired pattern, coalescence of the patterned (periodic) domains by lateral domain wall motion is prevented. (This would otherwise increase the domain inverted surface area and therefore require a larger charge transfer).

The dimensions and arrangement of the poled regions of the patterned poled material are set by the desired application of the patterned poled substrate. The dimensions of the patterned domain formation correspond to, but are not necessarily exactly the same as, the dimensions of the patterned contact-windows in the mask material. Using standard photolithographic techniques, feature dimensions as small as 1 µm can be realized in the insulating mask material, with any desired configuration. The depth of the domains is about equal to the thickness of the ferroelectric crystal, e.g. $\geq 500$ µm, and is limited only by the crystal substrate thickness.

Liquid conductor contact has a particular advantage. It eliminates the poor current distribution ability of thin film metallic electrodes and wire bonded contacts, which otherwise would lead to localized heating and an increased likelihood of electrical breakdown, combined with poor edge quality of the inverted domains at the crystal +z surface.

In a first alternative embodiment of the invention, the electrically-insulating dielectric film is composed of $SiO_2$ or other hard insulating dielectric material such as $TiO_2$ or $Al_2O_3$, providing the twin advantages of greater electrical insulation and increased robustness when compared to simple photoresist layers. Thin film electrically-insulating oxide layers may be readily deposited by evaporation (or alternatively R-F sputtering). Film thicknesses of >50 nm are appropriate. The hard insulating layer is patterned to produce the desired electric field control configuration using standard photolithographic techniques and an etching process, e.g. wet etching in buffered oxide etch. (Alternative etching techniques which could be used include reactive ion beam etching or ion bombardment etching.) A hard oxide insulating layer such as $SiO_2$ is more suited to large volume production than the relatively soft photoresist layer as the hard patterned film is less likely to be damaged during processing and handling.

Figure 4:
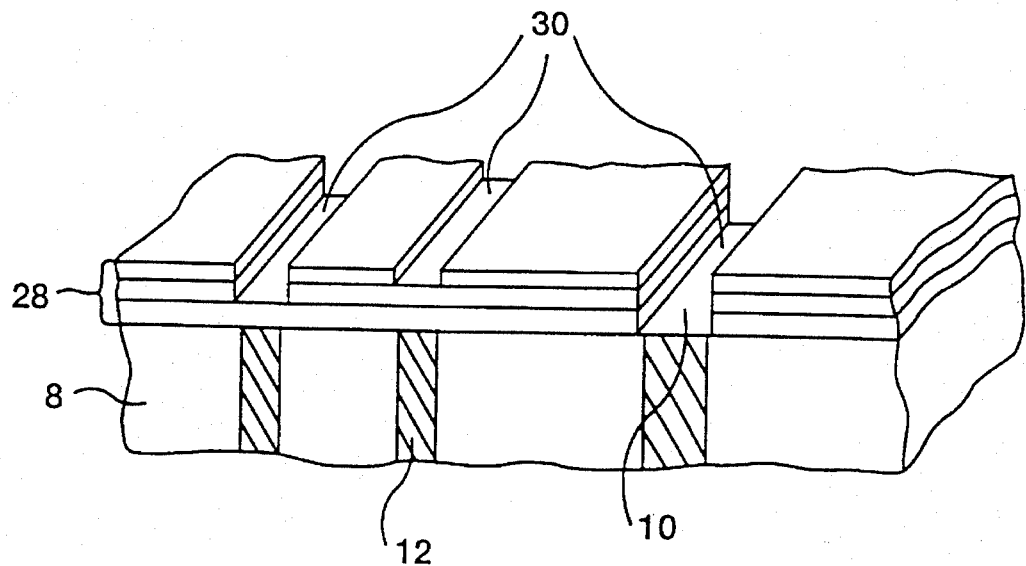
FIG. 4 is a perspective view in partial cross section of an alternative electric field controlling mask on a wafer of polable material.

In a second alternative embodiment of the invention, a different structure is used for the patterned electrically-insulating electric field control mask, which is shown in perspective and partial cross section in FIG. 4. The mask is composed of one or more layers 28 of electrically-insulating dielectric material, which may have different chemical compositions, and which are deposited by suitable techniques on the +z face of the $LiNbO_3$ crystal. The mask is patterned using standard photolithographic techniques. Patterning may completely open contact-windows 10 on the $LiNbO_3$ by removing all the layers of the mask, or create a mask-thickness-modulation-region 30 by leaving one or more planar layers at least partly intact on the crystal surface, resulting in no direct electrical contact to the crystal. The electric field within the crystal is modulated by the varying thickness of the insulating mask such that domain inversion 12 only occurs in the high electric field regions beneath the mask-thickness-modulation-regions or open contact-windows.

A single layer thickness modulated insulating mask structure which might for instance allow no direct electrical contact to the crystal surface can be created in a photoresist layer simply by underexposing the photoresist so that some material is left in all areas after development. A similar structure can be created in a hard insulator layer (e.g. $SiO_2$ or $TiO_2$) by incompletely etching the planar layer, using for instance wet chemical etching, reactive ion etching or ion beam bombardment etching. An example of a multilayer insulating mask structure is a layer of $SiO_2$ deposited on the crystal +z face (e.g. by evaporation or sputtering) with a thickness of about 50–1000 nm, covered by a layer of photoresist which may be up to a few microns in thickness. The photoresist layer is exposed and developed and the resulting pattern transferred to the $SiO_2$ layer by a suitable etching process (e.g. wet etching in buffered oxide etch), which may or may not penetrate completely through the $SiO_2$ layer to reach the crystal substrate. After patterning, the photoresist is left on the sample during poling, to increase the depth modulation of the insulating mask and therefore to increase the modulation of the electric field within the crystal. Note that the selective thickness of the dielectric film can be made to vary in many ways across the polable dielectric materials, including gradients of thickness, and periodic and a periodic patterns of multiple heights.

Figure 5:
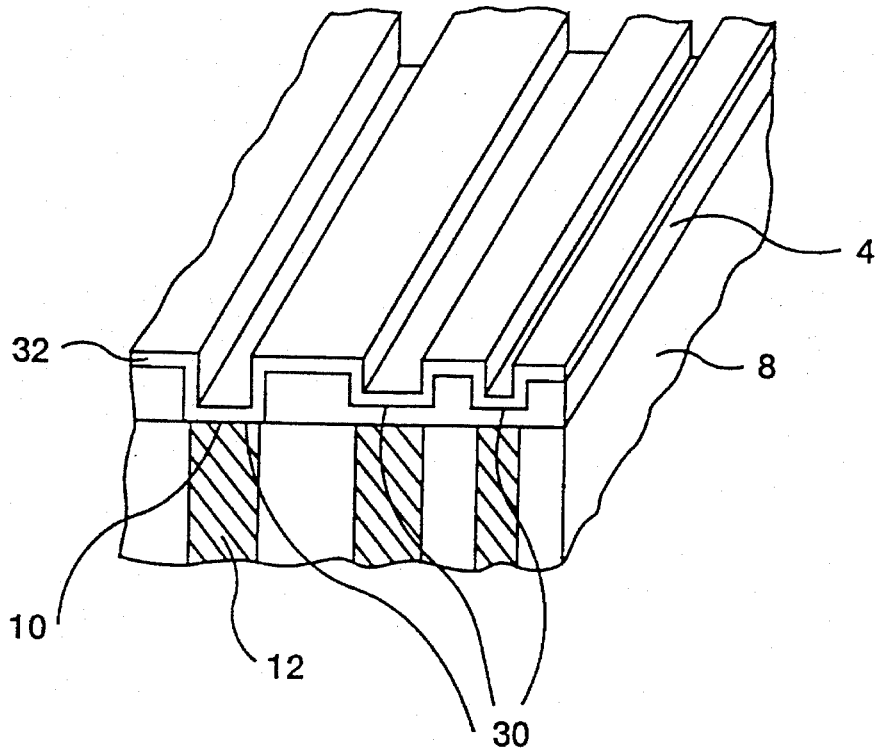
FIG. 5 is a perspective view in partial cross section of an alternative electric field conductive layer on a wafer of polable material.

A third alternative embodiment of the invention eliminates the effects of air bubbles trapped within the contact-windows or mask-thickness-modulation-regions in the electric field controlling insulating mask. Such air bubbles locally reduce the electric field by increasing the stand-off of the liquid conductor and inhibit poling from occurring. An electrically-conductive layer 32 (e.g. Al or other metal) is deposited (e.g. by evaporation or sputtering) over the patterned insulating mask 4, as illustrated in FIG. 5. The varied thickness of the mask is the amplitude modulation parameter which can be adjusted to produce the desired field modulation. Where the insulating mask material(s) has been completely removed 10 by the patterning process, the deposited electrically-conductive layer makes direct contact with the crystal surface. Overlaying the deposited conductive layer with a liquid electrical conductor results in electrical contact to all parts of a mask-thickness-modulation-region 10, 30, even if part of the region is covered by an air bubble, as long as the liquid conductor makes contact with the conductive layer at some point in the region. The continuous electrical contact over each mask-thickness-modulation-region translates into complete domain reversal and an improvement in the overall uniformity of the domain inversion pattern. Deposition of a thick electrically-conductive film over the patterned insulating mask allows electrical contact to be maintained over the entire deposited film, i.e. making electrical contact to any part of the thick deposited conducting film achieves contact with all of the mask-thickness-modulation-regions in the electric-field-controlling insulating mask. Electrical contact to the conducting film can be made by a liquid electrical conductor or alternatively by direct contact to a bulk electrically-conducting material adjacent to the +z surface.

Figure 6:
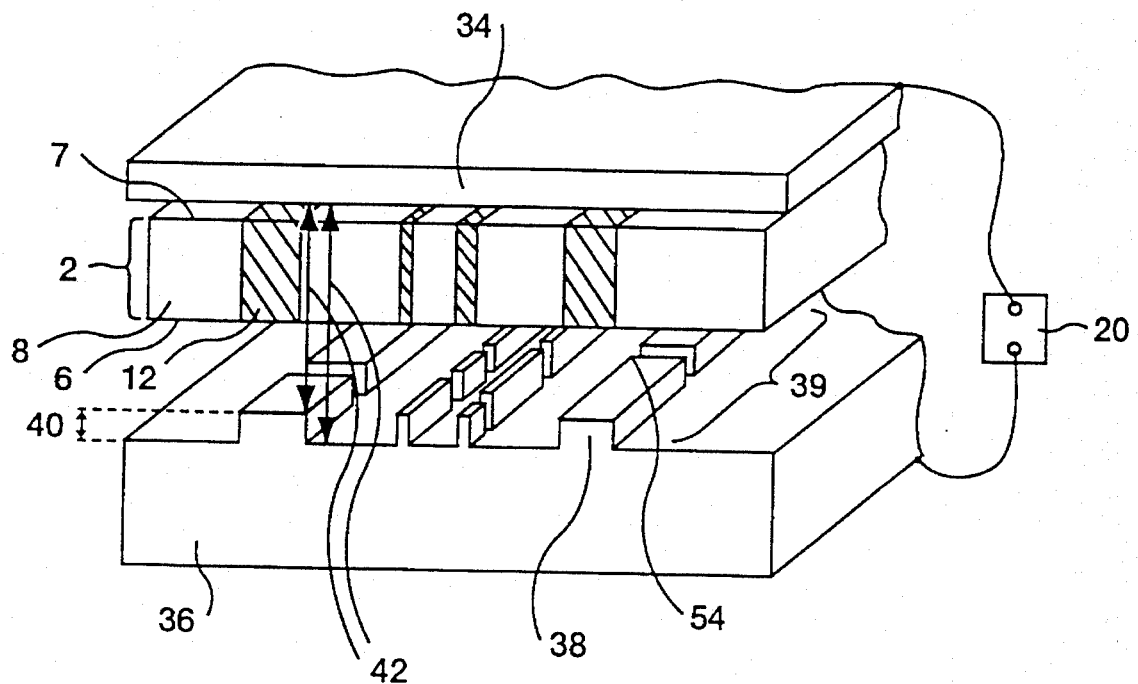
FIG. 6 is a perspective view in partial cross section of an alternative electric field conductive structure adjacent a wafer of polable material.

In a fourth alternative embodiment of the invention, a patterned second electrically-conductive material 36 having protrusions 38 in a configuration of modulated height 40 is used to control the electric field strength within the polable dielectric material, as illustrated in FIG. 6. The protrusions have selected heights to determine the modulation of the applied electric field strength, and selected transverse dimensions to determine the pattern of the electric field modulation. They may be composed of the same material as the electrode 36, or they may be fabricated from another electrically conductive material deposited on the electrode. A first electrically-conducting material 34, e.g., a metal plate, thin film or liquid conductive material, is placed adjacent a first surface, the −z surface 7, of the LiNbO₃ crystal. The patterned second electrically-conductive material is placed over a second surface, the +z surface 6, of the LiNbO₃ crystal, the second surface opposing the first surface and such that the protrusions confront the second surface. The differential distance 42 between the first electrically-conductive material and the patterned second electrically-conductive material is the parameter which controls the electric field strength in selected regions within the polable dielectric material. Upon application of an effective electrical potential 20 between the first electrically-conductive material and second electrically-conductive materials, poling 12 occurs only where the electric field in the polable dielectric material exceeds the domain inversion potential threshold of the material. The poling process produces selective reversal of domains in the polable dielectric material, in a pattern according to, but not necessarily with exactly the same dimensions as, the configuration of protrusions on the patterned second electrically-conducting material, resulting in a patterned poled dielectric structure 2. Note that the protrusions may be filled in with a dielectric material as long as they create a modulated electric field.

The planar configuration of the protrusions 39 of the second electrically-conductive material is defined by the desired application for the patterned poled material. The planar configuration may have significant curvature so that over a distance corresponding to many protrusions the surface defined by the protrusions takes on a strongly three dimensional character. Each protrusion may be designed to contain one or more regions of electric field concentration 54 which serve to nucleate domain formation. The region of electric field concentration may consist of a corner bounding one of the selected regions of electric field control. If the region of field control is a conductive material, the corner must be an outside corner; if it is a dielectric material, the corner must be an inside corner, producing field concentration in a conducting material which is formed around the dielectric material template.

The configuration of protrusions on the patterned electrically-conducting material can be produced by photolithographically patterning a layer of photoresist on the surface of the material and transferring the pattern into the material by etching, e.g. wet chemical etching, reactive ion etching or ion beam bombardment etching. The modulated height of the protrusions is determined by the duration of the etching process.

Figure 18:
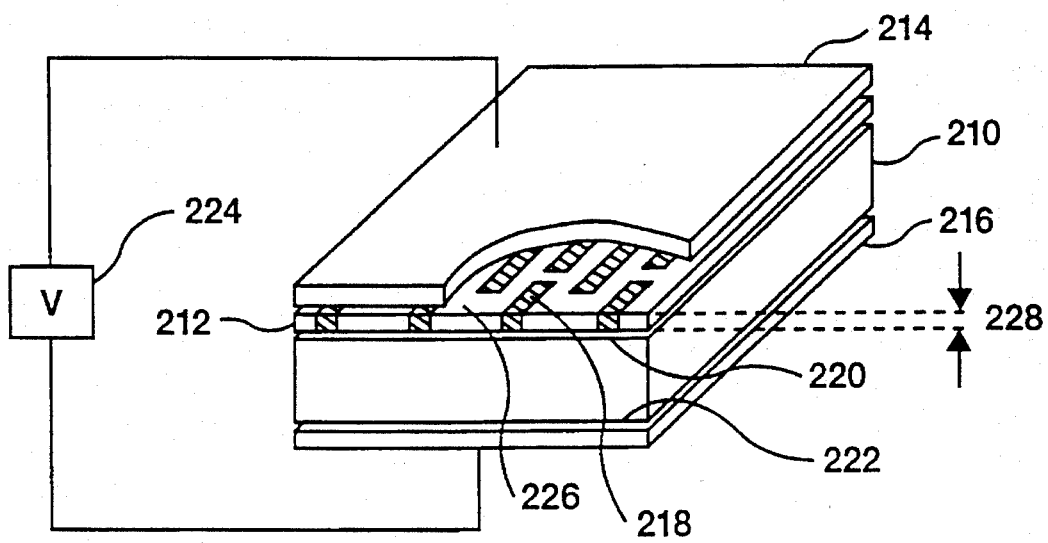
FIG. 18 is a perspective view in partial cross section of a modulated dielectric layer with electrodes adjacent a polable dielectric material.

In a fifth alternative embodiment of the invention (FIG. 18), a patterned dielectric film 212 having a modulated dielectric constant is used to control the electric field strength on the surface 220 and within the polable dielectric material 210 as illustrated in FIG. 18. The dielectric film 212 contains regions of enhanced 218 and/or diminished 226 dielectric constant to accomplish the modulation. The regions of modulated dielectric constant are arranged in the two dimensions locally transverse to the surface 220 of the polable dielectric material. A first electrically conductive material (electrode) 216 is placed adjacent the surface 222, and a second electrically conductive material 214 is placed adjacent the dielectric film which confronts the surface 220. The voltage source 224 is used to apply a potential between the two electrodes, the potential being above the threshold for causing domain orientation to occur in the material 210. The thickness 228 of the dielectric material is one parameter for controlling the modulation of the applied electric field strength, and the magnitude of the modulation of the dielectric constant of the film 212 is another parameter for controlling the modulation.

Figure 7:
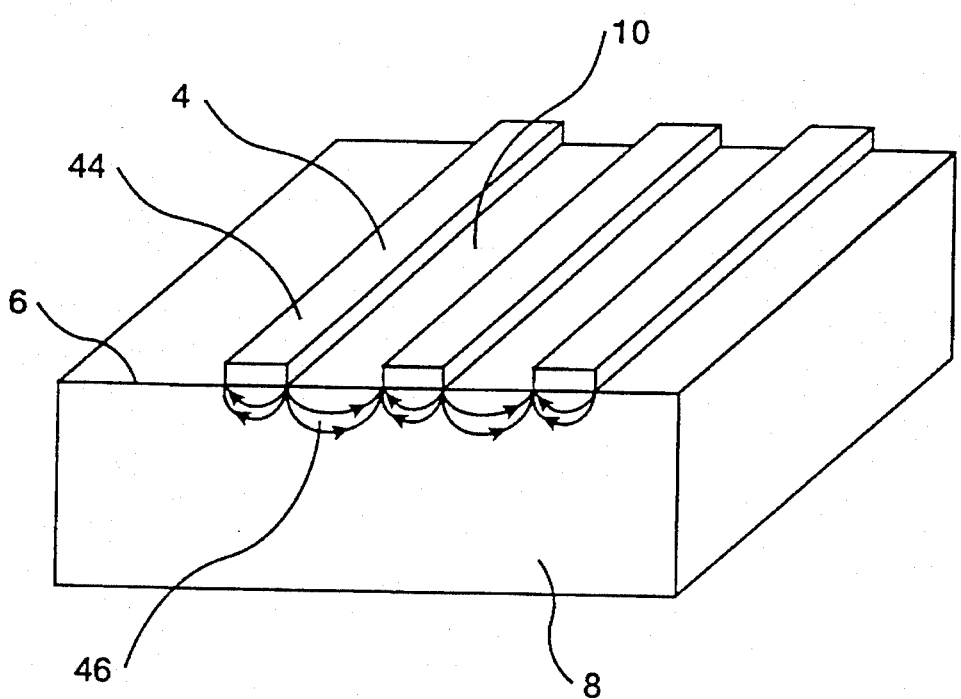
FIG. 7 is a perspective view in partial cross section for illustration of stress-enhanced poling.

The process of the invention may be enhanced by the application of stress or strain at the LiNbO₃ crystal surface, which will generate electric fields within the crystal due to the piezoelectric effect. The generated electric fields may either add to or subtract from the applied poling potential to assist or inhibit the poling process. A periodic stress can be applied to the crystal surface via the patterned electric field controlling insulating mask as suggested by the fields 46 illustrated in FIG. 7. By depositing, at elevated (or depressed) temperature, a planar layer 44 with a temperature coefficient of expansion different to that of LiNbO₃, and then cooling to room temperature, a stress is generated in the planar layer and exerted on the crystal 46. The tensile or compressive nature of the stress in the layer can be chosen by depositing a film with a higher or lower coefficient of thermal expansion respectively. Patterning of the planar layer, using photolithographic techniques, to form the electric field control mask 4, 44 generates a periodic strain across the crystal surface. Alternatively the planar layer can be deposited at room temperature, patterned, and the crystal heated to an elevated temperature (or cooled) during the poling process to generate the periodic strain. Patterning of a compressively strained layer exerts a tensile strain on the crystal under the center of the electrical field control mask, and a compressive strain on the crystal at the edge of the mask where the layer is able to expand towards the center of the patterned window 10.

An example of a suitable planar layer is SiO₂ which has a coefficient of thermal expansion of about $5.5 \times 10^{-7}/° C.$ compared to about $15 \times 10^{-6}/° C.$ for LiNbO₃ along the x and y axes. Applying a strain along the x axis results in an electric field generated along the z axis due to the $\epsilon_{311}$ coefficient of the piezoelectric tensor. For LiNbO₃ with an SiO₂ overlayer, the generated electric field is about volts per mm/° C. of temperature differential from the SiO₂ layer deposition temperature (V/mm/° C). Thus with a temperature differential of 100° C. from the layer deposition temperature, an internal field of about 1200V/mm is generated, which assists or opposes the applied poling voltage depending on the type of strain applied to the crystal.

When a poling force is applied to the polable dielectric material, the piezo-electric field pattern produced by the stress can be used to modulate the poling force above and below the effective force required for domain orientation. If the modulation is applied in the regions where nucleation of domain reversal occurs, it can be effective in creating a poling pattern within the polable material. In the case of electric field poling, uniform electrodes can be used with the poling pattern being controlled by the stressing pattern. The field assisted approach may also be applied with other poling techniques such as ion indiffusion, outdiffusion, and quick heat treatment.

Other alternative embodiments of the invention include the use of other types of polable materials. Other ferroelectric crystals which are suitable include for instance, LiTaO₃, KTP, KDP and its isomorphs, KNbO₃, BaTiO₃, SBN, Ag₃AsS₃, etc. The invention is also applicable to the patterned poling of non-ferroelectric materials such as fused silica and organic polymers. In each of these cases the patterned electric field controlling material used to define the patterned poling is formed on or placed adjacent to the crystal surface on which the inverted domains nucleate (e.g. +z for LiNbO₃).

It has been empirically determined, that when a configuration of electric field-controlling material is used to establish a poling pattern for fabricating a patterned poled dielectric structure, the poled domains are nucleated from regions of the field-controlling material which concentrate the electric field. Controlling the electric field using a photolithographically patterned electrically-conductive material, e.g. a metal film, deposited on the +z face of LiNbO$_3$ results in poled domain nucleation at outside corners of the metal film pattern, where the inside angle between adjacent sides of the conducting film pattern feature is less than 180°, when a high voltage pulse or pulses is/are applied between the patterned metal electrode on the +z face and a planar metal electrode on the −z face, with electrical contact to the metal electrodes made by bonding wires to the metal layers using an electrically-conducting epoxy. A corner, in the context of a planar pattern, means the junction of two boundaries which intersect at an angle at a geometric feature which is somewhat rounded on the scale of the pattern. An inside angle is an angle measured with the arc inside the structure. In the case of a three dimensional pattern, a corner means the intersection of an edge and a surface at a geometric feature which is somewhat rounded on the scale of the pattern. An outside corner contains less than a 180 degree inside angle between the axis of the corner and some axis in the plane. A point is a special case of an outside corner where edges meet. All of these regions enhance electric field strength, with an enhancement reduced by the degree of rounding relative to the scale of the pattern, and all types of outside corners can be used to nucleate domain inversion.

Figure 8:
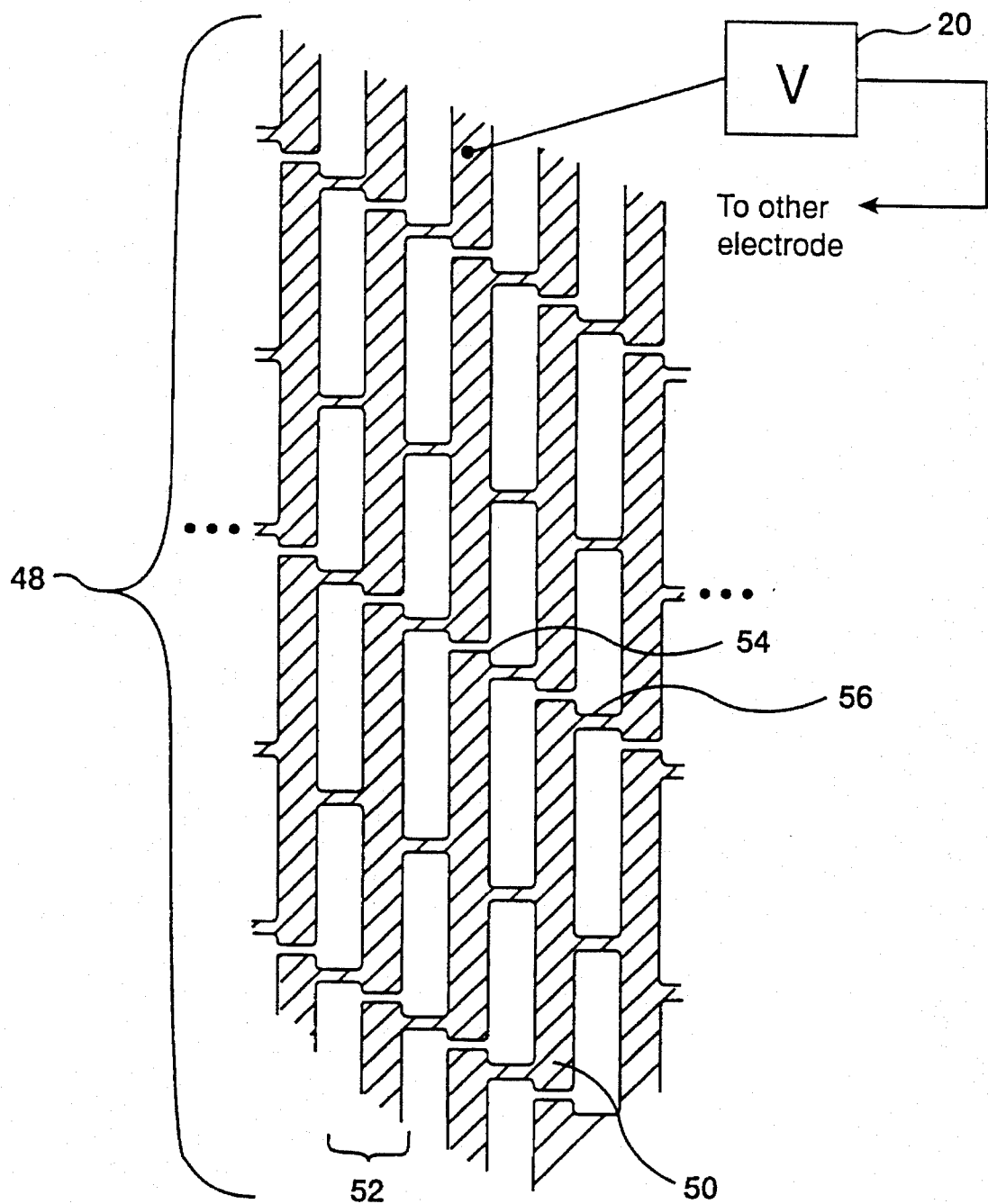
FIG. 8 is a plan view of a pattern of pole-controlling segments on a surface.

To achieve uniform patterned poling over a large crystal, a field-controlling electrically-conductive material structure 48 consisting of a plurality of planar segments 50 of electrically conducting material is fabricated on the +z face of the crystal, as illustrated in FIG. 8. This structure is distinguished by having a high and uniform density of corners for nucleation of domain orientation. Each segment of FIG. 8 has four corners for nucleation; the domain orientation propagates outwards from the nucleation points, under the conducting electrodes, to merge together near the middle of the segments, forming almost completely oriented areas substantially under the segments. The straight sectors of pole control 52 formed by each line of segments are then almost completely domain oriented. By sectors of pole control, we mean geometric areas composed of multiple segments, wherein the poling induced in the material is substantially controlled to be a desired value, when averaged over the segment poled regions and the gaps in the sector. The desired value may be very close to 100% as for instance in phase matching gratings, or it may be a much lower value, as for instance where several regions of pole control are to be distinguished in their function by their average poling fraction. The sector may be a multiply connected region containing other structures.

Such a structure can readily be fabricated by depositing a suitable electrically-conducting material (e.g. a metal such as Aluminum) and using standard photolithographic techniques to create the desired pattern. Embodiments of the patterned electric field controlling structure should be fabricated on the +z face of LiNbO$_3$ as this is where domains nucleate, with growth towards the −z face. For other polable materials, such as LiTaO$_3$, KTP, KNbO$_3$, BaTiO$_3$, SBN, Ag$_3$AsS$_3$, fused silica and polymers etc, the patterned electric field controlling mask should also be applied to the crystal surface at which domain nucleation occurs. The segments are aligned to comprise at least one sector 52 of pole control across the surface of the polable dielectric material. Each one of the segments includes at least one region 54 adapted to support the concentration of electric fields. The field concentration region may comprise a corner having an inside angle of less than 180° between adjacent sides, to promote nucleation of poling. During the applied high voltage pulse(s) domains spread laterally from the nucleation sites into the region of high electrical field defined by the segments of electric field controlling material, producing complete poling of each segment. Electrical continuity between the segments throughout the configuration is maintained via interconnecting conductive regions 56, ensuring good current distribution and uniformly patterned poling across the entire electric field control structure. Electrical connection of the electrical potential source to the patterned electrical conductor can be made by wire bonding or direct contact with the electrical conductor. Electrical connection to the −z face of the crystal is made by a further electrically-conducting material which may in any embodiment be, for instance, a liquid electrical conductor, a thin metal film deposited on the −z surface, or a bulk electrical conductor adjacent to the −z surface. The sectors of aligned segments of electric field control material can be arrayed to define a periodic pattern along an axis. The relative arrangement of the segments within a sector and of one sector to another can be adjusted to achieve the poling pattern required for a desired application.

For a bulk optic nonlinear optical frequency converter the field controlling material configuration of FIG. 8 is appropriate. The sectors comprising the aligned segments and the electrical interconnections between the segments are offset from one another so that a collimated (or focussed) laser beam travelling through the polable material perpendicular to the sectors sees a uniformly poled grating when integrated along the length of the device and the generated signal beam(s) can be maintained in the TEM$_{00}$ single transverse mode. The efficiency in this case is reduced from the ideal instance, which consists of uniform long bars stretching across the entire device aperture, because of the presence of both gaps between the segments and electrical interconnections among the segments. The reduction in the efficiency is determined by the duty cycle of the segments within a sector combined with the duty cycle of the electrical interconnections between the segments. The case of individual segments of length 20 μm separated by gaps of 2 μm, with 1 μm wide electrical interconnections reduces the efficiency to about 80% of the ideal case.

Figure 9:
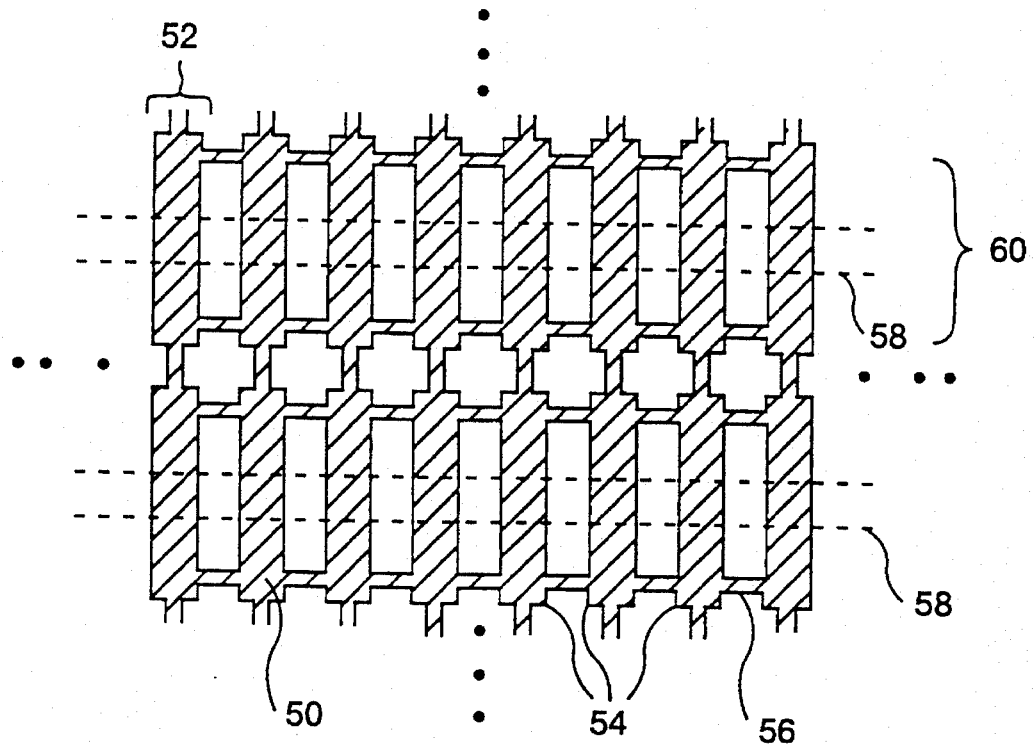
FIG. 9 is a plan view of a pattern with waveguides.

For an integrated optic waveguide-based nonlinear optical frequency converter, an embodiment of the desired electric field controlling structure is illustrated in FIG. 9. The sectors of the aligned segments 52 are arrayed such that an optical waveguide 58 can pass through a single row 60 of the segments 50. The electrical interconnections 56 between the segments are fabricated outside the path of the waveguide 58, so the efficiency of this embodiment is 100% of that of the ideal uniform long-bar configuration. Alignment of the waveguide with the poled segments can readily be achieved using suitable photolithographic alignment marks.

Figure 10:
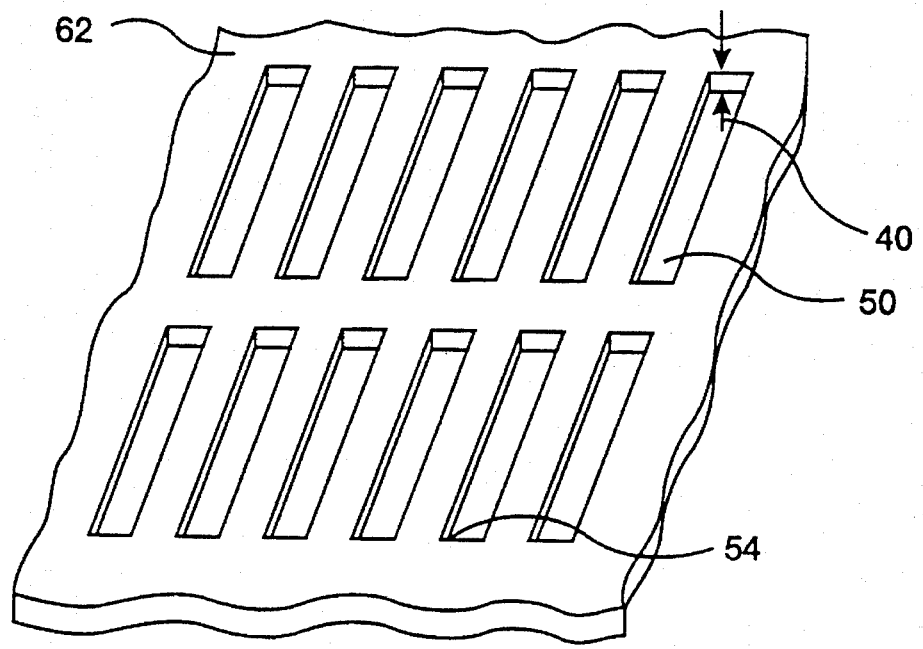
FIG. 10 is a perspective view of a modulated-height mask.

An alternative embodiment of the inventions of FIGS. 1, 3, 6, 8 and 9 is illustrated in FIG. 10. Here an electrically-insulating mask 62 forms the electric field controlling structure for thickness modulation used to establish a high domain nucleation density poling pattern for fabricating a patterned poled crystal. The segments 50 are formed by modulating the thickness 40 of the insulating mask 62, using photolithographic (and) etching processes. The insulating mask 62 may be formed of multiple planar layers of different chemical compositions. The mask thickness modulation may vary between completely removing sections of the insulating mask, and leaving part of one or more of the planar layers of the insulating mask intact. Each mask thickness modulation segment includes at least one electric field concentrating region 54. The electric field concentrating region may take the form of a corner of the segment where the included angle between adjacent sides of the mask thickness modulation region is less than 180°. The thickness modulated electric field control insulating mask is overlaid by an electrically-conducting material (not shown), which may be for example, a liquid electrical conductor or alternatively a metal film deposited on the insulating mask, which is electrically-connected to the source of electrical potential. The general arrangements of the sectors and the segments required to fabricate bulk and waveguide frequency conversion devices are the same as those used for the electric field controlling electrically-conducting material as illustrated in FIGS. 8 and 9, except that there is no longer any need to provide the electrical interconnections between the segments, as this function is achieved by the electrically-conducting overlayer on the thickness modulated insulating mask.

Figure 19:
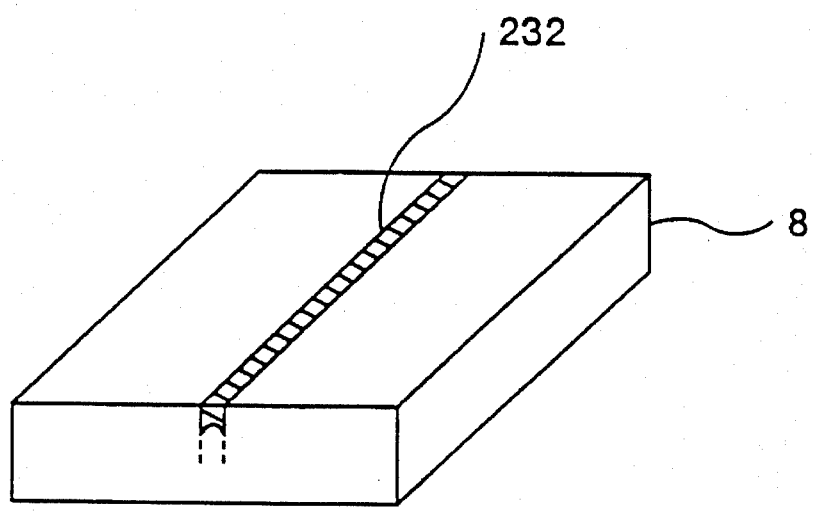
FIG. 19 is a perspective view in partial cross section of a waveguide alternative poling pattern in a wafer of polable material.
Figure 20:
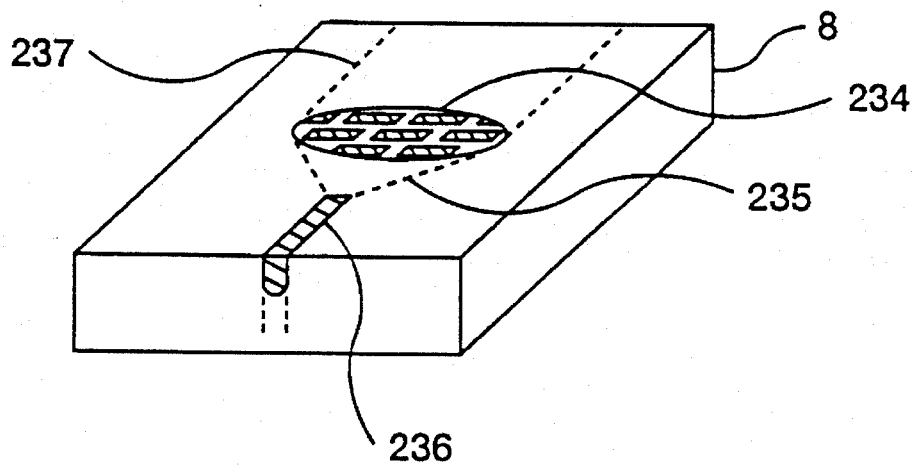
FIG. 20 is a perspective view in partial cross section of a waveguide and a lens alternative poling pattern in a wafer of polable material.

In all of the methods of fabricating patterned poled devices described above, the pattern is selected according to the application. A simple pattern is the periodic grating pattern in which the domain is inverted between two directions with 50% duty cycle. This pattern is used for example in nonlinear frequency conversion in quasi phase matched structures. The period of this pattern is selected to phase match the desired nonlinear interaction. Alternative patterns include a pattern coextensive with the waveguide 232 as shown in FIG. 19, or in FIG. 20 the cylindrical (also may be planar) lens pattern 234 and associated optical pathes 235, 37. In FIG. 19, when subjected for example to an electric field, the index of refraction of the poled region can be made to increase, making the waveguide region 232 capable of guiding an optical wave, and, in FIG. 20 making the lens region 234 capable of focussing an optical wave emerging from waveguide 236 terminated in the substrate. In FIG. 20, the lens is shown combined with a section of waveguide 236 in a collimator configuration.

An important variation of the above techniques is the use of a patterned electrode to imprint the poling pattern into the sample material as described above with FIG. 6. This configuration has the advantage that no processing (other than polishing and cleaning) is required on the sample to be patterned by poling. If the structure is inherent in the electrodes, the samples can be mass produced as rapidly as they can be mounted, poled, and dismounted from the electrodes. While the discussions of the alternative poling configurations do not necessarily refer to this possibility, these configurations can also be adapted to the patterned electrode configuration. For example, in FIG. 5, the conducting material 32 and the patterned dielectric material 4 can be bonded to the surface of an external electrode (not shown) which is used to physically place the layers 4 and 32 adjacent to the polable dielectric material 8 as shown. While the adjacent placing includes the case without any significant gap, there may be a small gap between the layers 4 and 32 and the material 8, provided that the gap is small compared to the typical dimensions of the pattern according to which the layers are corrugated. If the gap is small, the change in the magnitude of the electric field in the material 8 is not too severe.

The patterns of electrically conductive material of FIGS. 5, 6, 8, and 9 can all be attached to or fabricated into an electrode used for mass production of electric field poled wafers. The pattern of dielectric material of spatially varying dielectric constant of FIG. 18 can also be attached to an electrode for mass production. The crenulated electrodes 180 of FIG. 17 can also be attached to or fabricated into a covering electrode (not shown) provided that nonconductive regions are provided in the covering electrode over the location of the trench electrode on the wafer so as not to create a short circuit or significantly perturb the electric field strength at the crenulations. Nonconductive regions in the covering electrode with a depth as large as the dimension separating the crenulated electrode from the trench electrode are sufficient. The dielectric layer structures of FIGS. 3, 4 and 10 can also be overlaid with a deposition of conducting material as in FIG. 5, and attached to an electrode for mass production.

As the depth of the inverted domain structure fabricated by the methods of the invention of FIG. 1 and its alternative embodiments is limited only by the substrate crystal thickness, the resulting patterned poled crystal can be used for bulk optical devices based on ferroelectric domain inversion.

Figure 11:
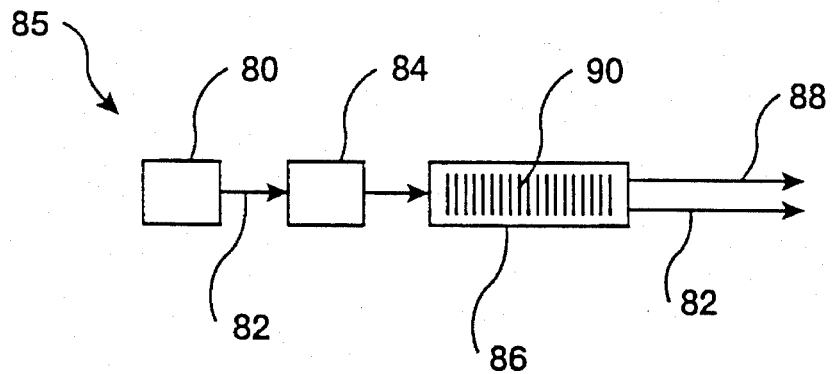
FIG. 11 is a schematic diagram of an optical frequency converter configured as a second harmonic generator.

The patterned poled dielectric structure 86 fabricated in a non-linear material by the invention of FIG. 1 and its alternative embodiments can be used to construct an optical frequency multiplier source, illustrated schematically in FIG. 11. The optical frequency multiplier generates a frequency multiplied signal output 88 at a multiple of the fundamental frequency of an input laser signal 82. The optical frequency source 85 could, for instance, form a second harmonic generator, and is described as such here. The fundamental input laser signal, produced by a laser exciter 80 such as a semiconductor diode laser, solid state laser, gas laser or any other type of laser, is coupled into the patterned poled dielectric structure by a coupling means 84, e.g. by a lens or system of lenses. The coupling means may comprise any number of antireflection coatings. The patterned poled dielectric structure consists of a phasing structure 90 designed to achieve quasi-phase-matching between the fundamental signal and the frequency multiplied signal, or second harmonic, resulting in the generation of the second harmonic. The phasing structure may consist of a periodic domain reversal pattern where the sign of the nonlinear coefficient is reversed at odd integer multiples of the coherence length between the fundamental signal and the second harmonic. The coherence length ($l_c$) for second harmonic generation is equal to the propagation distance required for the fundamental signal and the second harmonic to become $\pi$ radian out of phase with each other, and is defined as $$l_c = \frac{\lambda_{fund}}{4*(n_{sh} - n_{fund})} \quad (1)$$

Here $n_{sh}$ is the refractive index for the second harmonic signal and $n_{fund}$ and $\lambda_{fund}$ are respectively the refractive index and wavelength of the fundamental signal. By performing domain inversion at odd integer multiples of $l_c$, i.e. as soon as the phase mismatch between the fundamental signal and the second harmonic has become $\pi$ radian, the sign of the optical nonlinear coefficient is reversed, the phase of the generated second harmonic is flipped by $\pi$ radian, and the two frequencies are correctly rephased. Thus the quasi-phase-matching (QPM) grating period for any nonlinear conversion interaction within the transparency range of the patterned poled dielectric material can be computed from the known frequency dispersion characteristics of the dielectric material (and the waveguide if a waveguide is used) and is, for a 50—50 spatial duty cycle of the QPM grating, an even integer multiple of the coherence length.

A means must be provided for ensuring coincidence between the frequency of the fundamental signal input and the quasi-phase-matching frequency (center frequency) of the patterned poled dielectric phasing structure. The phasing structure only provides perfect QPM between one particular fundamental frequency, termed here the center frequency, and its second harmonic. Due to the frequency dispersion of the dielectric material, a signal at a frequency other than the center frequency experiences a different rate of phase mismatch with its second harmonic as it propagates through the phasing structure and thus has a different coherence length than the center frequency. Thus the phase reversals of the second harmonic, which occur at the coherence length for the center frequency, do not correctly rephase the off-center frequency signal and its second harmonic. This incorrect rephasing reduces the efficiency of the generation of the second harmonic from the off-center frequency, compared to the efficiency at the center frequency, setting a limit on the frequency acceptance bandwidth of the QPM phasing structure.

To achieve highly efficient second harmonic generation, the fundamental frequency signal input must be nearly coincident with the center frequency of the QPM patterned poled dielectric phasing structure. This coincidence may be achieved by tuning the frequency of the input fundamental laser signal, or by changing the effective period of the QPM phasing structure, i.e. altering the coherence length for the second harmonic generation interaction, by changing the temperature of the patterned poled dielectric structure (which alters the refractive index of the material and causes expansion of the material which changes the length of each period) or by tilting the structure relative to the propagation direction of the fundamental signal, or by applying electric fields to change the mean refractive index of the material.

Figure 12:
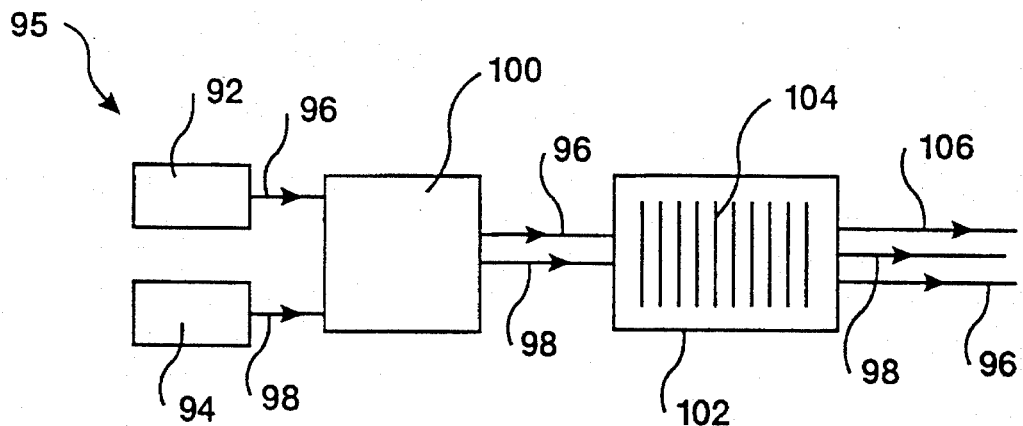
FIG. 12 is a schematic diagram of a mixer.

The patterned poled dielectric structure fabricated in a nonlinear material by the invention of FIG. 1 and its alternative embodiments may be used to create other types of optical frequency sources, such as the optical frequency source, illustrated schematically in FIG. 12, to produce an optical output signal 106, the frequency ($v_3$) of which is a linear combination of a first fundamental frequency ($v_{f1}$) and a second fundamental frequency ($v_{f2}$), forming a set of frequencies. The optical source comprises a first laser exciter 92 for producing a first laser signal 96 of the first fundamental frequency and a second laser exciter 94 for producing a second laser signal 98 of the second fundamental frequency, and a frequency mixer 102 fabricated from a patterned poled dielectric structure. The laser exciters may be, for instance, semiconductor diode lasers, solid state lasers, gas lasers or any other type of laser. A coupling means 100, e.g. a lens or system of lenses, is provided to optically couple the first and second laser signals into the frequency mixer. For high efficiency the coupling should result in significant spatial and temporal overlap between the first and second laser signals within the optical frequency mixer 95. The frequency mixer comprises a phasing structure 104 according to the invention which receives the first laser signal and the second laser signal as inputs, and provides quasi-phase-matching between the inputs and the optical output signal resulting in the generation of the optical output signal. The coherence length, and thus QPM period, for an interaction between a desired set of frequencies can be computed from expressions similar to Equation 1 which are well known in the prior art. The principle of conservation of energy determines that the frequency of the generated optical output signal is a linear combination of the first fundamental frequency and the second fundamental frequency, i.e. $v_3 = \pm m v_{f1} \pm n v_{f2}$, where $m,n=1,2,3,\ldots$. When the output signal frequency is the sum of the input frequencies the optical source is termed a sum frequency mixer and energy is transferred from both the input frequencies to the output frequency. When the output signal frequency is the difference of the input frequencies the optical source is termed a difference frequency mixer and energy is transferred from the high input frequency to both the output frequency and the lower input frequency.

A means must be provided to ensure phase matching between the two input signals and the output signal within the phasing structure. This can be achieved by tuning the frequency of one or both of the input laser signals until coincidence with the center frequency of the QPM phasing structure is realized. Alternatively the effective length of the QPM phasing structure period, and thus the phasematched coherence length which determines the phasematched set of frequencies, can be altered by changing the temperature of the patterned poled dielectric material or by tilting the patterned poled dielectric structure relative to the propagation direction of the first and second input signals, or by applying electric fields to change the index of refraction of the material.

Figure 13:
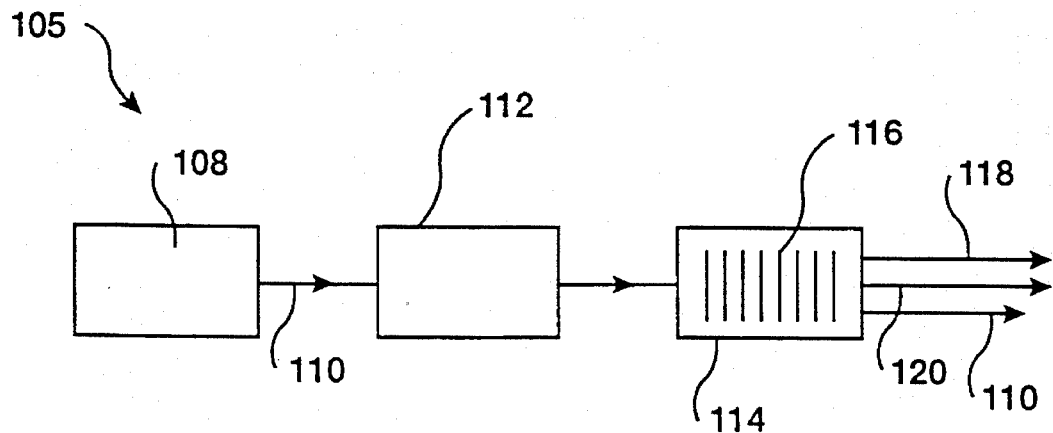
FIG. 13 is a schematic diagram of an optical parametric device.

The patterned poled dielectric structure fabricated in a nonlinear material by the invention may also be used to create an optical frequency source, illustrated schematically in FIG. 13, to produce a first optical output signal 118 and a second optical output signal 120 from an input optical signal 110. The frequency of the optical input signal is the sum of a first frequency of the first output signal and a second frequency of the second output signal, forming a set of frequencies. The optical frequency source comprises a laser exciter 108, for instance a semiconductor diode laser, solid state laser, gas laser or any other type of laser, for producing the input optical signal, and an optical parametric device 114 fabricated from a patterned poled dielectric structure. A coupling means 112, e.g. a lens or system of lenses, is provided to optically couple the input optical signal to the optical parametric device. The optical parametric device comprises a phasing structure 116 which receives the input optical signal and provides quasi-phase-matching between the input optical signal and the first optical output signal and the second optical output signal, resulting in the generation of the optical output signals. The coherence length, and therefore the QPM period for an interaction between a desired set of frequencies can be computed from expressions similar to Equation 1 which are well known in the prior art. The principle of conservation of energy determines that the sum of the frequencies of the first and second optical output signals is equal to the frequency of the input optical signal. Energy is transferred from the input optical signal to both the first optical output signal and the second optical output signal. Spontaneous noise emission at the output signal frequencies is amplified by the power transfer from the input signal. The addition of a suitable resonator structure, which may consist of a configuration of optically reflecting surfaces arrayed about the structure, or may comprise distributed optical reflectors fabricated within the structure, around the patterned poled dielectric structure, may provide optical feedback at any or all of the input and output signal frequencies. If the round trip parametric gain at the optical output signal frequencies, due to the power transfer from the optical input signal, exceeds the roundtrip optical losses, including absorption, scattering and reflection losses, at the output frequencies, then the parametric device operates as an optical parametric oscillator.

A means must be provided to ensure phase matching between the optical input signal and the two optical output signals within the phasing structure. This can be achieved by tuning the frequency of the input laser signal until coincidence with the center frequency of the QPM phasing structure is realized. Alternatively the effective length of the QPM phasing structure period, and thus the phasematched coherence length which determines the phasematched set of frequencies, can be altered by changing the temperature of the patterned poled dielectric material or by tilting the patterned poled dielectric structure relative to the propagation direction of the first and second input signals.

Figure 14:
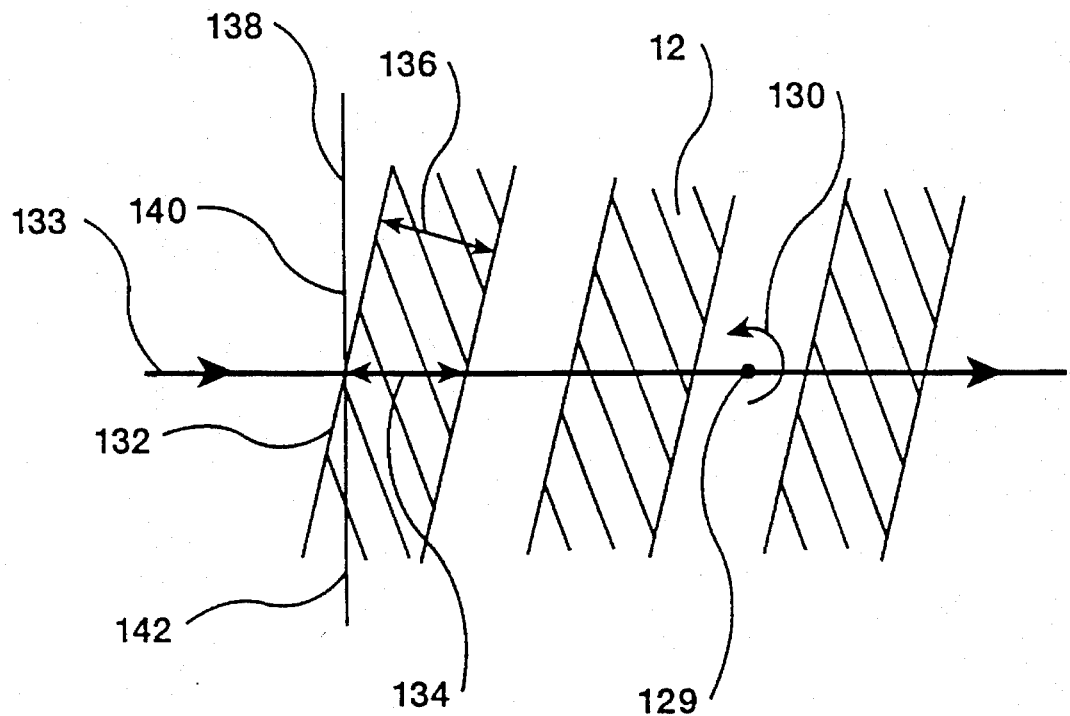
FIG. 14 is a schematic diagram of a wave rotator.

The peak wavelength for a quasi-phase-matched nonlinear interaction is determined by the period of the QPM grating. It is therefore possible to tune the patterned poled nonlinear optical material fabricated by the invention into phase matching with a particular laser wavelength by rotating the material about an axis 129 (FIG. 14). A rotation 130 in the plane of the crystal, as shown in FIG. 14, alters the angle between the domain boundary walls 132 and the propagation direction of the light beams 133. By simple trigonometry, this can be seen to alter the effective period 134 of the QPM grating, increasing it from the period 136 obtained with the beams at normal incidence to the grating. Thus, if the patterned nonlinear material is designed to have a very slightly shorter QPM wavelength than that required for the desired interaction, the material can be tuned into phasematching with a fixed frequency laser (e.g. an Nd:YAG laser) using a small rotation of the crystal. However, the extent of the angle tuning range is limited by the nonparallelism of the phase-fronts 138 (plane of constant phase) of the interacting optical signal beams and the tilted domain boundaries of the QPM grating. Tilting of the domain boundaries relative to the phase-fronts of the interacting optical signal beams causes a phase-front to overlap more than one domain region. Signal light which is generated by the phase-front 140 in one domain region will be $\pi$ radians out of phase with the light generated 142 in the adjacent domain region by the same phase-front causing destructive interference and a reduction of the output signal from the device.

Figure 21:
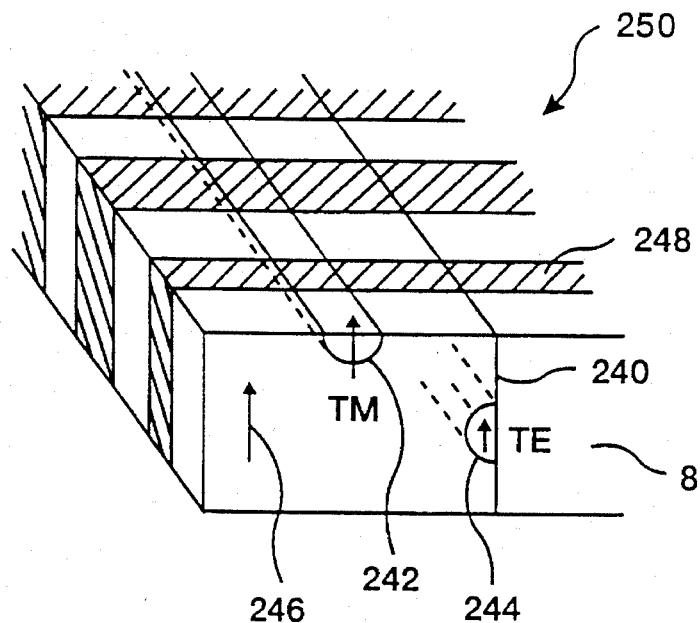
FIG. 21 is a perspective view in partial cross section of a sliced poled wafer with a TE waveguide.

The invention further provides a process for creating transverse electric (TE) polarized periodically poled waveguide devices which access the large d33 nonlinear optical coefficient. The periodically poled substrate is a ferroelectric crystal which may be, for instance, $LiNbO_3$, $LiTaO_3$, KTP, $KNbO_3$, $BaTiO_3$, SBN, $Ag_3AsS_3$, etc. The process is illustrated schematically in FIG. 21. The polable dielectric material substrate 8 is poled as shown in regions 248 which penetrate substantially into the bulk substrate. The substrate wafer is preferably $LiNbO_3$, in which case the z axis (the optical axis of the nonlinear material) is oriented as shown by the vector 246. An annealed proton exchanged (APE) waveguide diffused into the top z-cut surface of the wafer will form a TM waveguide as shown for waveguide 242. To form a TE waveguide using the favorable APE technique, an x-cut or y-cut region must be exposed (or an intermediate cut between the pure x- and y- cuts can be used). The cut 240 reveals an edge with the poling axis 246 substantially in the plane of the edge. The waveguide 244 may be fabricated in the edge by annealed proton exchange, forming a TE polarized waveguide. This is useful for example in periodically poled frequency conversion devices if the poling extends into the bulk of the substrate.

Figure 15A:
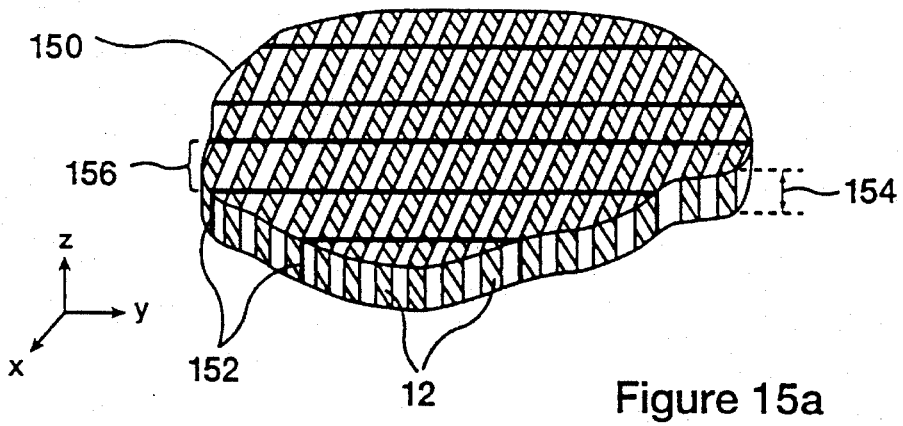
FIG. 15a–c are perspective views of a process for making TE mode poled waveguide structures.
Figure 15B:
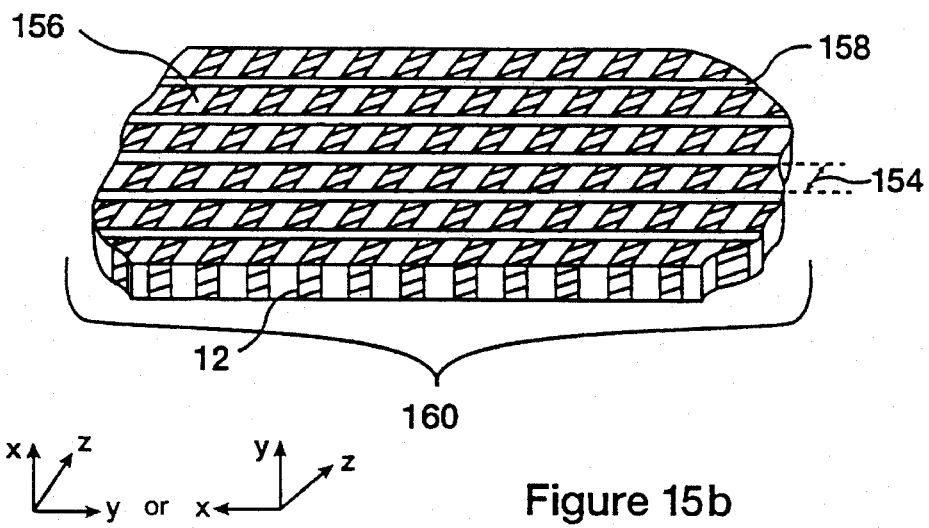
Figure 15C:
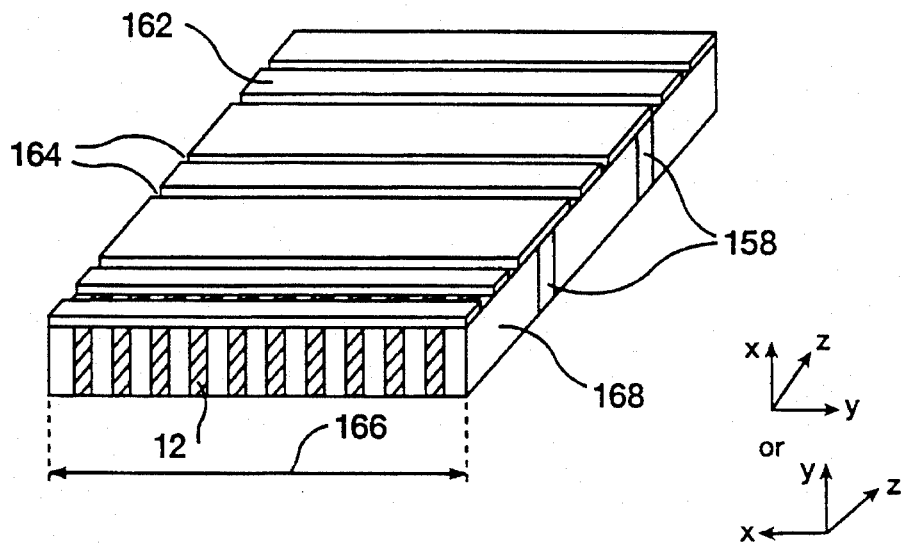

FIGS. 15*a–c* illustrate a low cost fabrication technique for a $LiNbO_3$ substrate as an example. Step 1 involves periodically poling a z-cut $LiNbO_3$ substrate 150 using the methods of the invention of FIG. 1 and its alternative embodiments. The resultant inverted domains 12 extend completely through the crystal substrate, while maintaining the dimension and periodicity of patterned poling which is imposed by the photolithographically patterned electric field-controlling mask on the +z surface.

After periodic poling and removal of the patterned insulating mask, the z-cut substrate is sliced using saw cuts 152 as shown in FIG. 15*a*, creating thin strips 156 perpendicular to the inverted domain bars 12 using a wafer saw. The individual strips are rotated by 90° about the y axis shown in FIG. 15*a*, exposing the x (or y) cut faces. The z-cut faces are cemented together 158, e.g. with shellac or an epoxy cement, to form a composite wafer 160 (FIG. 15*b*). (Note that if the poled regions are oriented along the y axis of the material instead of the x axis as shown in FIG. 15*a*, the cut and the rotation will be along the x axis.) Unpoled x-cut material may be cemented around the edges of the patterned poled pieces to increase the surface area of the composite wafer. The + and − faces (or + and − y) faces of the composite wafer are optically polished, for instance using a Logitech Precision Polishing Machine, to yield an optically flat and scratch free composite substrate composed of multiple sections of bulk periodically poled material.

A thin film 162, e.g. 200 nm of $SiO_2$ or Al, is deposited on one of the polished x-cut (or y-cut) surfaces to act as a waveguide mask. Photoresist is spun on top of the deposited film and exposed through a suitable photomask. After developing and hardbaking the photoresist, the waveguide mask pattern 164 is transferred to the deposited thin film by wet etching in, for instance buffered oxide etch (alternatively a lift-off technique can be used to deposit and pattern the waveguide mask after the development of the photoresist layer) resulting in the structure illustrated in FIG. 15*c*. The waveguide mask pattern defines waveguides with propagation direction along the thin strips of crystal, that is along the axis of the periodic poling pattern. The composite wafer is now diced perpendicular to the waveguide propagation direction, into device length sections 166, and the crystal endfaces 168 optically polished to enable coupling into the waveguide (FIG. 15*c*).

Waveguides are ideally formed using the annealed proton exchange (APE) process. Alternatively, ions other than protons may also be indiffused or ion exchanged into the polable material. In the case of APE, the composite wafer strips are immersed in molten benzoic acid to exchange protons from the acid for lithium ions in the crystal. The resulting step index waveguide is then annealed for several hours at around 300° C. to diffuse the protons deeper into the crystal and create a low-loss waveguide with high optical nonlinearity. Finally, the individual device slices are separated and cleaned, each device chip having a multiplicity of waveguides running perpendicular to the periodically poled domain inversion grating structure. The APE waveguide increases the crystal extraordinary refractive index, forming a waveguide for light polarized along the z-axis, which in x or y cut material is TE polarized. Thus this invention yields a TE polarized quasi-phase-matched domain inverted waveguide which removes the need for a polarization rotation element between a TE polarized semiconductor diode laser and the waveguide chip.

An alternative fabrication process would perform the waveguide exchange and annealing steps before the composite wafer is diced and the end faces polished, so as to avoid damage to the fragile end faces during handling.

Figure 16:
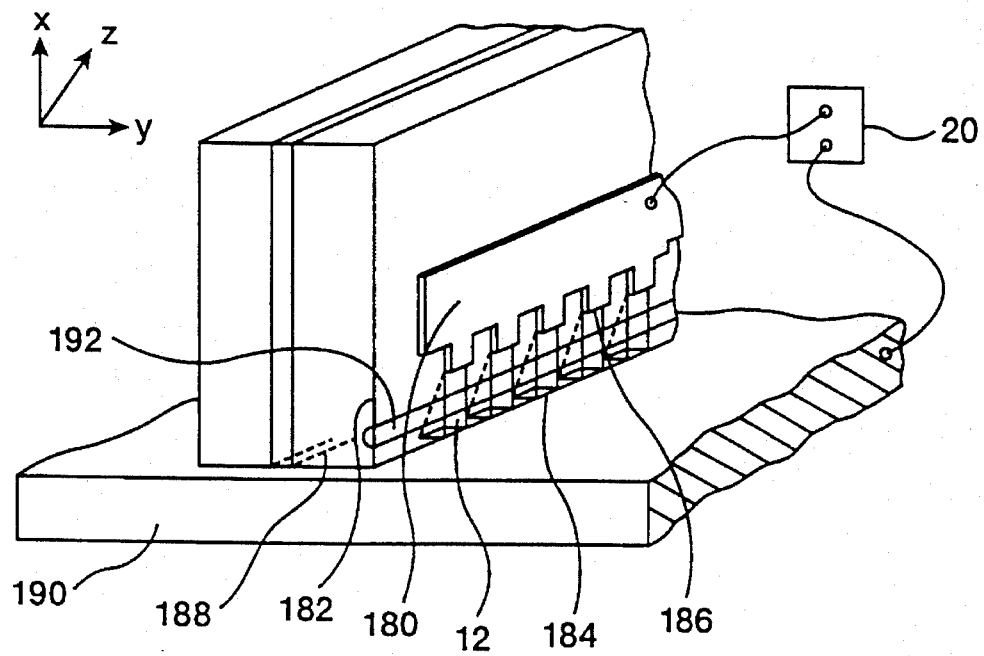
FIG. 16 illustrates a device with electrodes on transverse faces.

Poling of x (or y) cut ferroelectric crystals an be achieved using an electric field and an electrode configuration of a first electrode 190 and a second electrode 180 as shown in FIG. 16. The second electrode 180 is formed by patterning (using standard photolithographic techniques) an electrically conductive material deposited on the x (or y) cut surface 182 of a ferroelectric crystal substrate, which could consist of $LiNbO_3$, $LiTaO_3$, KTP, $KNbO_3$, $BaTiO_3$, SBN, $Ag_3AsS_3$, etc, some hundreds of microns from the edge 184 of the crystal. For a substrate of LiNbO$_3$, the crenulated edge 186 of the electrode must extend towards the $-z$ face 188 of the crystal so that domains 12 nucleate on the patterned electrode and grow towards the $-z$ face. A large number of electrodes may be fabricated on a wafer in an essentially parallel array which can then be sliced to create individual strips. The first electrode 190 is formed from electrically conductive material, which may consist of a metal plate, placed adjacent to the z-cut side face of the strip. Alternatively a film of conductive material, such as a metal, may be deposited directly on the z-cut surface of the strip. A number of strips may be stacked together before poling, as indicated in FIG. 16, to provide a mass manufacturable process. A continuous or pulsed electric field greater than the coercive field of the crystal (about 20 kV/mm) is applied across the two electrodes to produce poling of the crystal. The applied voltage opposes the spontaneous polarization direction of the substrate crystal, i.e. a negative pulse should be applied to an electrode formed on the $-z$ face of the crystal. As the first electrode is adjacent a side face of the crystal, the applied electric field extends deep into the crystal, resulting in deep poled domain formation between the first electrode placed adjacent to the z-cut face of the crystal and the patterned second electrode. The first electrode is substantially planar, transverse of the second electrode. The electrodes may include angles and curves such that they separate from each other, provided that the applied field is sufficient to produce poling in the desired regions. The patterned second electrode spatially modulates the applied electric field to achieve periodic domain inversion by producing poling only in the high electric field regions. After domain inversion the second conductive electrode may be stripped from the crystal and a waveguide 192 fabricated, using standard photolithographic techniques, in the poled region of the crystal, and propagating along the y (or x) axis. For a substrate of LiNbO$_3$ the waveguide would preferably be fabricated by the annealed proton exchange technique because of its insensitivity to photorefractive damage. Other waveguides may also be used.

Figure 17:
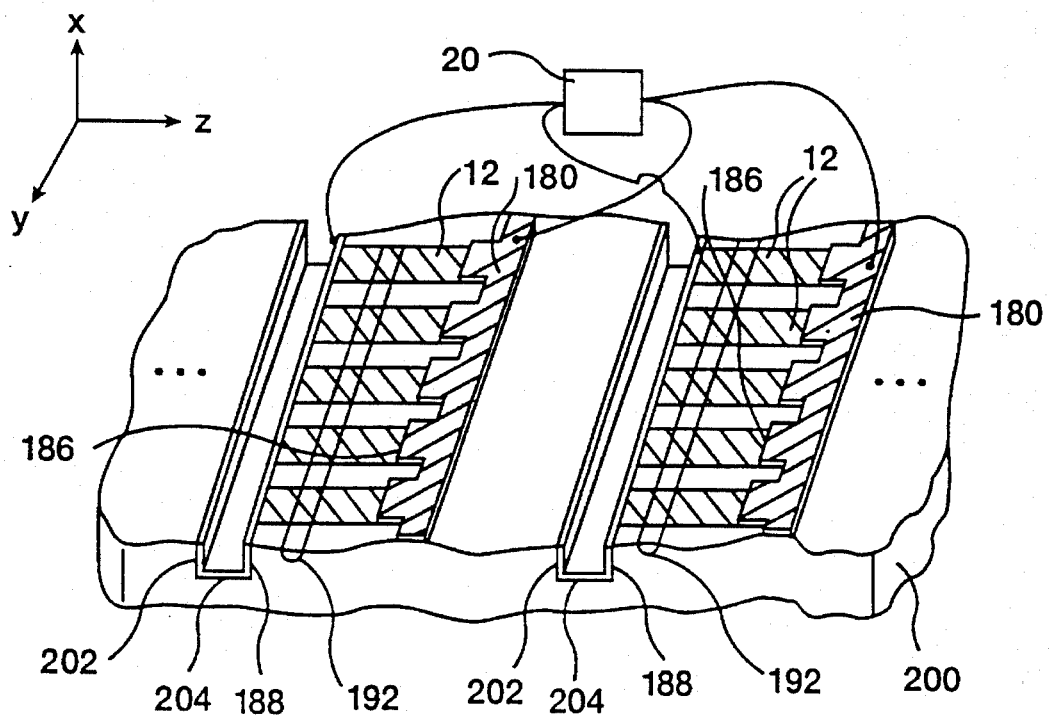
FIG. 17 is a perspecture view showing a crenulated electrode with a trough.

An alternative electrode arrangement for poling x or y cut ferroelectric crystals is shown in FIG. 17. A standard wafer scale photolithographic process is used to pattern a large number of thin film first conductive electrodes 180 (e.g. Al) on the x (or y) cut face of the ferroelectric crystal. In the case of the substrate crystal 200 being LiNbO$_3$, the crenulated edge 186 of each the first conductive electrode should face towards the $-z$ surface 188 of the crystal so that domains 12 can nucleate on the patterned first electrode and grow along the $-z$ direction. After patterning the first electrodes, a photoresist layer is spun onto the wafer surface and hard baked to provide a liftoff mask for the second electrode 202 deposition step. A dicing saw is used to cut shallow (about 50 μm deep) trenches 204 between the first conductive electrodes. An electrically conductive film 202 (e.g. Al) is deposited into the trenches, using for example sputtering, to create a second electrode on the $-z$ cut face of the trench. The photoresist film is removed with commercial resist stripper (or acetone). Electrical connection to the first conductive electrodes on the x (or y) face may be made by wire bonding. Contact to the second electrodes on the z-cut faces of the trenches can be made using physical contact (or a solder bond). Application of a continuous or pulsed electric field greater than the coercive field of the crystal (about 20 kV/mm) and opposing the crystal spontaneous polarization (the negative pulse is applied to the $-z$ face of the region being poled) across the first conductive electrode and the second conductive electrode causes poling of the crystal. As the second electrode on the $-z$ face of the trench extends below the level of the x (or y) cut face, the electric field dips deep into the crystal and forms deep domains. The patterned first electrode on the x (or y) cut face spatially modulates the applied electric field to create periodic domain inversion. A substantially parallel array of electrodes may be fabricated on a substrate. Poling can achieved in a single step if the trench electrodes are all interconnected, for example along one end of the trench electrodes to the side of the desired pattern, and if all of the crenulated electrodes are interconnected, for example along the other end, forming an interdigitated pattern. The desired effective potential can then be applied to all electrode pairs at the same time if electrical contact is made for example to the end connections.

After removal of the primary electrode on the x (or y) cut face, a waveguide 192 is fabricated in the domain inverted region of the crystal using standard photolithographic techniques. Ideally the annealed proton exchange process would be used for a LiNbO$_3$ substrate. The waveguide should be fabricated in a region between the two electrode locations where the poling has penetrated substantially into the polable material. After waveguide fabrication the wafer is diced and end polished to produce individual device chips, each with a multiplicity of periodically poled TE polarized waveguides.

In the case of polable materials other than LiNbO$_3$ being used as the substrate material, e.g. LiTaO$_3$, KTP, KNbO$_3$, BaTiO$_3$, SBN, Ag$_3$AsS$_3$, fused silica or organic polymers, the orientation of the patterned first electrode and the second electrode is determined by the material surface at which domain nucleation occurs. The patterned first electrode must be positioned at the nucleation surface of the volume to be poled.

This invention enables fabrication of patterned poled LiNbO$_3$ at low cost, in bulk form, and in novel configurations. The applications which the invention makes possible include high density optical storage, information display, fluorescence detection, and printing. Several unique laser systems use this material.

Figure 22:
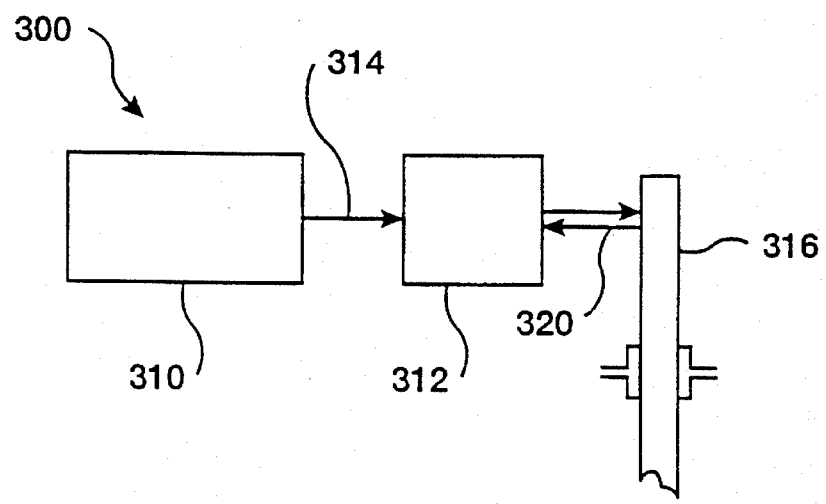
FIG. 22 is a block diagram of a laser system for data storage.

FIG. 22 shows an optical data storage system 300 which uses an optical frequency source 310. The second harmonic generator 85 or the sum frequency generator 95 may be used for source 310. The laser signal 314 from the source 310 is coupled by the beam directing means 312 onto the optical disk 316, which may be fabricated from, for example, a phase change or a magneto-optic type of optical recording medium. The beam directing means 312 comprises optical elements to compensate for aberrations in the signal 314, focus the signal to a small spot on the optical disk 316, and collect and detect the reflected light 320 from the disk 316. The data on disk 316 is present as a series of regions with different reflectivity for the detected optical polarization, which modulate the reflected light, enabling readout of ones and zeros. The beam directing means 312 also provides focus adjustments responsive to focus error signals, and beam deflection responsive to tracking error signals, these signals being derived from optical and detection elements in the beam directing means 312 as known in the prior art. The patterned poled material of the optical frequency source 310 is particularly well suited to generation of robust and inexpensive green, blue, and ultraviolet light which can be focussed more tightly than the existing infrared and red sources now used in optical data storage devices, providing greater data storage density. It has further advantages with respect to integration with modulators for intensity control, mode converters for power enhancement, and spectral filters for frequency control, which are desirable in the data storage application.

Figure 23:
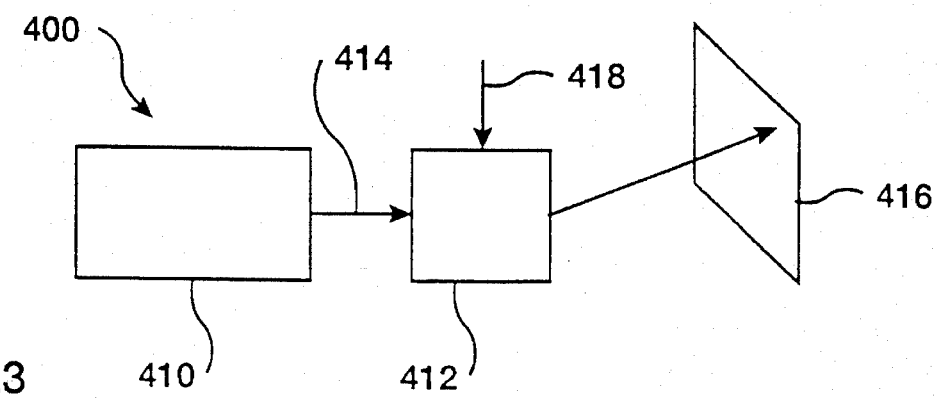
FIG. 23 is a block diagram of a laser system for display.

FIG. 23 shows an optical display system 400 which uses an optical frequency source 410 which may be monochrome or which may supply three or more colors. The second harmonic generator 85 and/or the sum frequency generator 95 may be used as portions of the source 410. The laser signal 414 from the source 410 is coupled by the beam directing means 412 onto the display screen 416. The beam directing means 412 comprises optical elements to compensate for aberrations in the signal 414, focus the signal to a pixel on the screen 416, and scan the beam across the pixels of the screen with controlled spectral intensity according to an image control input 418. Spectral control may be achieved by passing spectral control signals to modulators within the source 410. The beam directing means 412 may also provide focus adjustments and steering adjustments. The patterned poled material of the optical frequency source 410 is particularly well suited to generation of robust and inexpensive red, green, and blue beams, and light of other colors as may be desired for display. It has further advantages with respect to integration with modulators for intensity control, mode converters for power enhancement, and spectral filters for frequency control, which are desirable in the display application.

Figure 24:
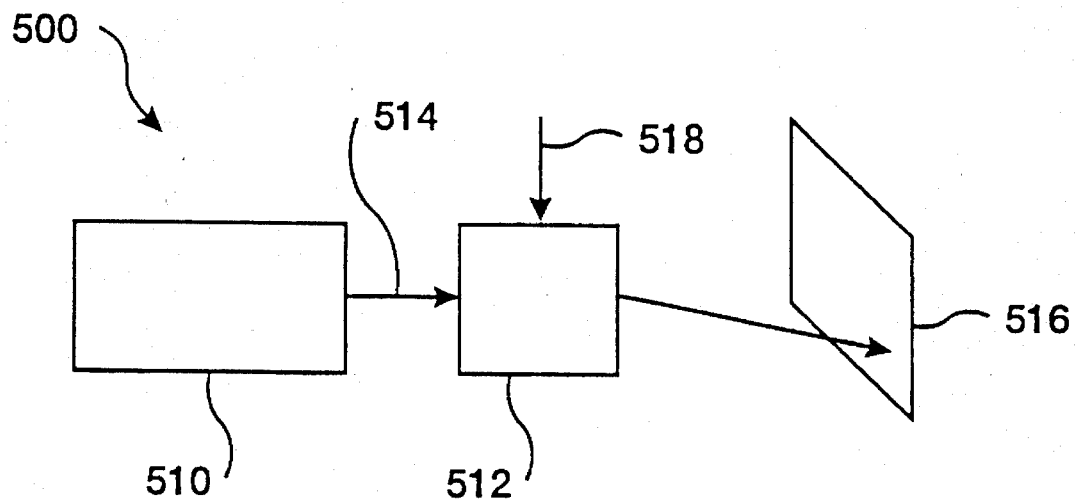
FIG. 24 is a block diagram of a laser system for printing.

FIG. 24 shows an optical printing system 500 which uses an optical frequency source 510. The second harmonic generator 85 or the sum frequency generator 95 may be used for source 510. The laser signal 514 from the source 510 is coupled by the beam directing means 512 onto the printing surface 516. The beam directing means 512 comprises optical elements to compensate for aberrations in the signal 514, focus the signal to a pixel on the printing surface 516, and scan the beam across the pixels of the printing surface with controlled spectral intensity according to a print control input 518. The beam directing means 512 may also provide focus adjustments and steering adjustments. The patterned poled material of the optical frequency source 510 is particularly well suited to generation of robust and inexpensive green, blue, and ultraviolet beams, which are well suited for imaging on long-lived photochemically exposed films. It has further advantages with respect to integration with modulators for intensity control, mode converters for power enhancement, and spectral filters for frequency control, which are desirable in the printing application.

Figure 25:
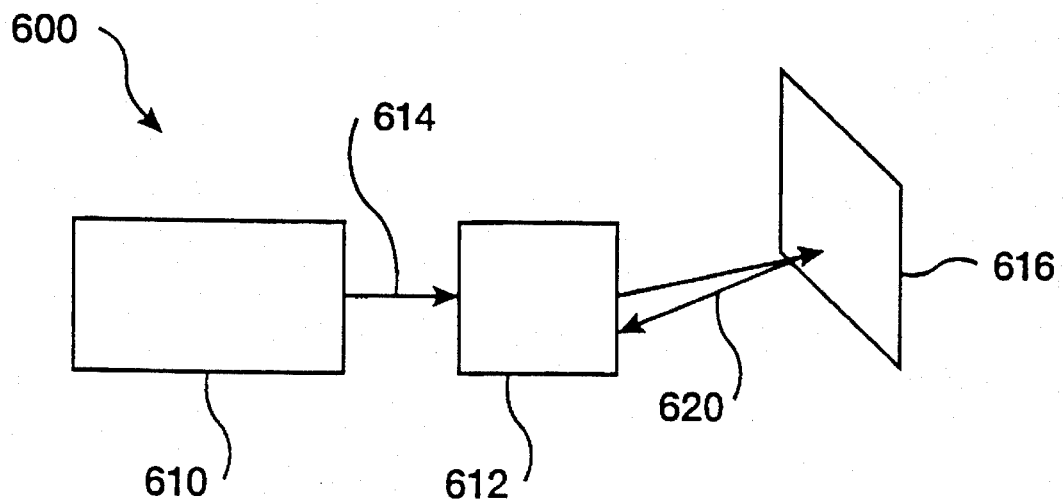
FIG. 25 is a block diagram of a laser system for fluorescent detection.

FIG. 25 shows a fluorescence detection system 600 which uses an optical frequency source 610. The second harmonic generator 85 or the sum frequency generator 95 may be used for source 610. The laser signal 614 from the source 610 is coupled by the beam directing means 612 onto the sample 616. The beam directing means 612 comprises optical elements to compensate for aberrations in the signal 614, focus the signal to a pixel on the sample 616, and scan the beam across the sample. The beam directing means 612 also receives and spectrally filters fluorescent light 620 emitted from the sample, and detects the fluorescent intensity. The patterned poled material of the optical frequency source 610 is particularly well suited to generation of robust and inexpensive blue, and ultraviolet beams needed for exciting fluorescence in the sample. It has further advantages with respect to integration with modulators for intensity control, mode converters for power enhancement, and spectral filters for frequency control, which are desirable in the fluorescent detection application.

The invention has now been explained with reference to specific embodiments. Other embodiments will be apparent to those of ordinary skill in the art. Therefore, it is not intended that the invention be limited, except as indicated by the appended claims, which form a part of this invention description.

What is claimed is:

1. An optical frequency source for producing at least one output frequency comprising:

a laser exciter means for producing at least a first laser signal of a fundamental frequency;

a patterned poled dielectric structure for receiving said at least a first laser signal as an input to produce at least one output signal at a first output frequency, wherein said patterned poled dielectric structure contains a plurality of domains, said plurality of domains characterized by a plurality of domain walls, wherein said plurality of domain walls are approximately parallel to a poling direction, and wherein a selected amplitude modulation parameter is used for controlling electric field strength in selected regions within a polable dielectric material to fabricate said patterned poled dielectric material; and a coupling means for coupling said at least a first laser signal with said patterned poled dielectric structure and for phase matching said at least a first laser signal with at least one frequency-converted signal in said patterned poled dielectric structure.

2. The optical frequency source according to claim 1 wherein said patterned poled dielectric structure is a frequency doubler.

3. The optical frequency source according to claim 1, said first output frequency being a linear combination of said fundamental frequency and a second frequency, wherein said patterned poled dielectric structure is an optical frequency mixer, said mixer for receiving said first laser signal and a second laser signal as inputs to produce said first output frequency signal.

4. The optical frequency source according to claim 1, said fundamental frequency being the sum of said first output frequency and a second output frequency, wherein said patterned poled dielectric structure is an optical parametric generator, said generator for receiving said first laser signal as input to produce said first output frequency signal and a second output frequency signal.

5. A method for fabricating a TE-mode-polarized optical waveguide in a bulk poled dielectric structure comprising:

slicing a bulk-poled wafer material with a cut to expose an edge, such that a poling axis of said bulk poled dielectric structure lies approximately in the plane of said cut; and in-diffusing ions into said edge along a track to increase optical index of refraction along said track for TE-mode components of an optical signal along said edge.

6. A TE-mode-polarized optical waveguide in a bulk poled dielectric structure comprising:

a cut bulk-poled wafer material having an edge with a poling axis of said bulk poled dielectric structure lying approximately in the plane of said cut; and a track of in-diffused ions in said edge to increase optical index of refraction along said track for TE-mode components of an optical signal along said edge.

7. The waveguide according to claim 6 wherein said bulk poling is in a pattern which is traversed by said track.

8. A patterned poled dielectric structure formed by applying a potential between a first electrode and a second electrode comprising:

a polable wafer material;

a first electrode; and a second electrode, said second electrode being along a first substantially planar surface of said wafer material, said second electrode having a crenulated edge opposing said first electrode;

wherein said first electrode is disposed on a second substantially planar surface of said wafer material transverse to said first surface such that an effective electric potential applied between said first electrode and said second electrode produces an electric field distribution which substantially penetrates said polable wafer material to induce domain orientation in selected regions of said polable material.

9. The structure according to claim 8 wherein said second planar surface is an edge of said wafer material.

10. The structure according to claim 8 wherein said second planar surface is at least a side of a groove in said wafer material.

11. The structure of claim 8 further including:

a waveguide track in said polable wafer material between said first electrode and said second electrode.

12. A method for fabricating a TE-mode-polarized optical waveguide in a bulk poled dielectric structure comprising:

slicing a bulk-poled wafer material with a cut to expose an edge, such that a poling axis of said bulk poled dielectric structure lies approximately in the plane of said cut; and increasing an effective optical index of refraction along said edge along a track for TE-mode components of an optical signal along said edge, wherein said effective optical index of refraction is increased relative to said wafer material surrounding said track.

13. A TE-mode-polarized optical waveguide in a bulk poled dielectric structure comprising:

a cut bulk-poled wafer material having an edge with a poling axis of said bulk poled dielectric structure lying approximately in the plane of said cut; and a region of increased effective optical index of refraction along said edge along a track for TE-mode components of an optical signal along said edge, wherein said effective optical index of refraction is increased relative to said wafer material surrounding said track.

14. The waveguide according to claim 13 wherein said bulk poling is in a pattern which is traversed by said track.

15. A patterned bulk-poled dielectric structure, comprising a bulk-poled dielectric material containing a plurality of poled segments, wherein said plurality of poled segments are aligned to form a plurality of sectors of patterned bulk-poled dielectric material intersecting a plane of said bulk-poled dielectric material.

16. The patterned bulk-poled dielectric structure of claim 15, further comprising at least one optical waveguide traversing a portion of said plurality of poled segments.

17. The patterned bulk-poled dielectric structure of claim 15, wherein at least one sector of said plurality of sectors is disposed adjacent to another sector of said plurality of sectors.

18. The patterned bulk-poled dielectric structure of claim 15, wherein at least one sector of said plurality of sectors is separated from another sector of said plurality of sectors by a predetermined distance.

19. A patterned poled dielectric structure, comprising:

a polable dielectric material; and a plurality of poled segments in said polable dielectric material, wherein said plurality of poled segments are aligned to form a plurality of sectors of patterned poled dielectric material intersecting a plane of said polable dielectric material, and wherein a first portion of said plurality of poled segments within a first sector of said plurality of sectors defines at least a first spatial frequency for interaction and a second portion of said plurality of poled segments within a second sector of said plurality of sectors defines at least a second spatial frequency for interaction.

* * * * *

UNITED STATES PATENT AND TRADEMARK OFFICE
CERTIFICATE OF CORRECTION

PATENT NO. : 5,615,041  
DATED : March 25, 1997  
INVENTOR(S) : Simon J. Field et al.

It is certified that error appears in the above-identified patent and that said Letters Patent is hereby corrected as shown below:

<u>Column 1,</u>  
Line 4, insert the following text:

-- STATEMENT REGARDING FEDERALLY SPONSORED RESEARCH OR DEVELOPMENT  
    This invention was made with Government support under contract no. DASG60-94-C-0057 awarded by the U.S. Army Space and Strategic Space Command. The Government has certain rights in the invention --.

Signed and Sealed this

Nineteenth Day of March, 2002

*Attest:*

*Attesting Officer*

JAMES E. ROGAN  
*Director of the United States Patent and Trademark Office*